US009411660B2

(12) United States Patent
Aoshima

(10) Patent No.: US 9,411,660 B2
(45) Date of Patent: Aug. 9, 2016

(54) LOCK CONTROL APPARATUS AND LOCK CONTROL METHOD

(71) Applicant: FUJITSU LIMITED, Kawasaki-shi, Kanagawa (JP)

(72) Inventor: Naoto Aoshima, Fujisawa (JP)

(73) Assignee: FUJITSU LIMITED, Kawasaki (JP)

( * ) Notice: Subject to any disclaimer, the term of this patent is extended or adjusted under 35 U.S.C. 154(b) by 345 days.

(21) Appl. No.: 13/972,572

(22) Filed: Aug. 21, 2013

(65) Prior Publication Data

US 2013/0339560 A1 Dec. 19, 2013

Related U.S. Application Data

(63) Continuation of application No. PCT/JP2011/054353, filed on Feb. 25, 2011.

(51) Int. Cl.
*G06F 12/00* (2006.01)
*G06F 9/52* (2006.01)
*G06F 17/30* (2006.01)

(52) U.S. Cl.
CPC ........ *G06F 9/52* (2013.01); *G06F 9/526* (2013.01); *G06F 9/524* (2013.01); *G06F 17/30362* (2013.01)

(58) Field of Classification Search
CPC .................. G06F 9/526; G06F 17/30362
USPC ........................................... 710/200
See application file for complete search history.

(56) References Cited

U.S. PATENT DOCUMENTS

| 4,096,561 | A | * | 6/1978 | Trinchieri | G06F 9/524 707/758 |
| 4,249,241 | A | * | 2/1981 | Aberle | G06F 9/52 710/200 |
| 5,161,227 | A | * | 11/1992 | Dias | G06F 17/30362 707/E17.007 |
| 5,202,990 | A | * | 4/1993 | Saikawa | G06F 13/14 710/200 |
| 5,247,672 | A | * | 9/1993 | Mohan | G06F 9/526 707/999.008 |
| 5,263,155 | A | * | 11/1993 | Wang | G06F 9/466 707/695 |

(Continued)

FOREIGN PATENT DOCUMENTS

| JP | 63-124139 | 5/1988 |
| JP | 02-291028 | 11/1990 |

(Continued)

OTHER PUBLICATIONS

International Search Report, mailed in connection with PCT/JP/2011/054353 and mailed May 31, 2011.

(Continued)

*Primary Examiner* — Paul R Myers
(74) *Attorney, Agent, or Firm* — Fujitsu Patent Center

(57) ABSTRACT

A lock control apparatus includes a control unit that controls acquisition of a lock for using a shared resource shared among a plurality of tasks by a task according to first lock information that indicates whether to permit the tasks to acquire the lock, and a determining unit that determines whether there is a conflict of requests for acquisition of the lock by the tasks, wherein when the determining unit determines that there is a conflict of requests for acquisition of the lock, the control unit controls acquisition of the lock by the tasks according to second lock information that indicates whether to permit acquisition of the lock when there is a conflict.

9 Claims, 14 Drawing Sheets

(56) References Cited

U.S. PATENT DOCUMENTS

| | | | | |
|---|---|---|---|---|
| 5,392,433 A * | 2/1995 | Hammersley | G06F 9/52 | 710/200 |
| 5,469,575 A * | 11/1995 | Madduri | G06F 9/52 | 707/999.003 |
| 5,559,979 A * | 9/1996 | Shiga | G06F 15/173 | 711/216 |
| 5,734,909 A * | 3/1998 | Bennett | G06F 9/52 | 707/999.008 |
| 5,737,611 A * | 4/1998 | Vicik | G06F 9/52 | 710/200 |
| 6,052,781 A * | 4/2000 | Weber | G06F 9/4401 | 713/100 |
| 6,141,720 A * | 10/2000 | Jeffords | G06F 9/52 | 710/108 |
| 6,412,034 B1 * | 6/2002 | Chan | G06F 9/52 | 710/200 |
| 6,480,918 B1 * | 11/2002 | McKenney | G06F 9/526 | 710/200 |
| 6,542,891 B1 * | 4/2003 | Loen | G06F 9/52 | 707/704 |
| 2008/0184249 A1 * | 7/2008 | Adams | G06F 9/526 | 718/104 |
| 2011/0296069 A1 * | 12/2011 | Tarta | G06F 9/526 | 710/200 |

FOREIGN PATENT DOCUMENTS

| | | |
|---|---|---|
| JP | 03-083142 | 4/1991 |
| JP | 4-23047 A | 1/1992 |
| JP | 06-059917 | 3/1994 |
| JP | 6-282448 A | 10/1994 |
| JP | 10-11302 A | 1/1998 |
| JP | 2898012 B2 | 5/1999 |

OTHER PUBLICATIONS

Japanese Office Action mailed Jun. 10, 2014 for corresponding Japanese Application No. 2013-500805, with English Translation, 12 pages.

* cited by examiner

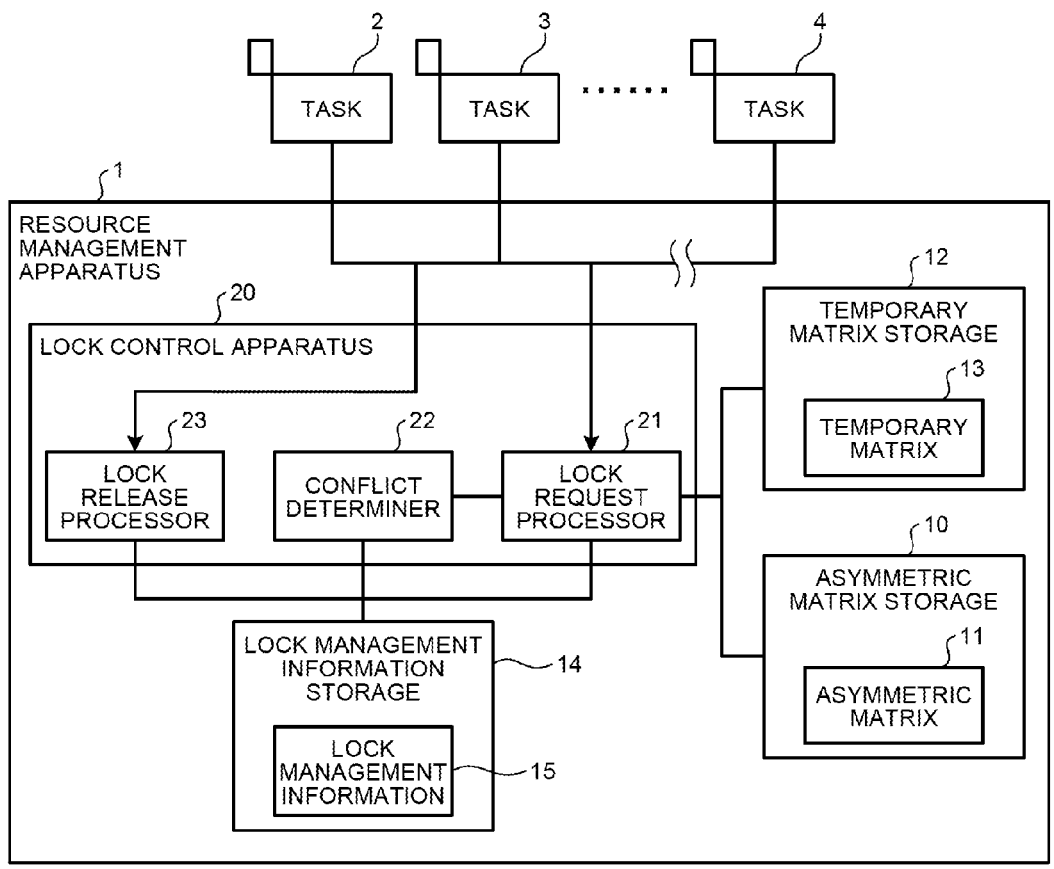

| | | NEW MODE | | |
|---|---|---|---|---|
| | | EXCLUSIVE MODE | SHARED MODE | RELEASED |
| CURRENT MODE | EXCLUSIVE MODE | N | Y (RETAINED IN EXCLUSIVE MODE) | |
| | SHARED MODE | | | |
| | RELEASED | | | |

|  |  | NEW MODE | | |
|---|---|---|---|---|
|  |  | EXCLUSIVE MODE | SHARED MODE | RELEASED |
| CURRENT MODE | EXCLUSIVE MODE | N | N | Y |
|  | SHARED MODE | N | Y | Y |
|  | RELEASED | Y | Y | Y |

LOCK CONTROL APPARATUS AND LOCK CONTROL METHOD

CROSS-REFERENCE TO RELATED APPLICATION

This application is a continuation of International Application No. PCT/JP2011/054353, filed on Feb. 25, 2011 and designating the U.S., the entire contents of which are incorporated herein by reference.

FIELD

The embodiments discussed herein are related to lock control apparatuses and lock control methods.

BACKGROUND

Known lock mechanisms permit a specific task to use a shared resource, such as a central processing unit (CPU) or a memory. As an example lock mechanism, a known technique enables a task to acquire a lock in an "exclusive mode" in which only the task that has acquired the lock uses a shared resource or a "shared mode" in which other tasks are permitted to refer to the shared resource.

Such a task acquires a new lock of the shared resource according to the combination of the mode of a lock acquired by another task that currently uses the shared resource and the mode of a new lock that the task attempts to acquire. Specifically, the task acquires the new lock of the shared resource according to a matrix that associates the permission to acquire the lock with the combination of the current lock mode and the new mode. Upon completing using the shared resource, thereafter, the task releases the lock.

FIG. 16 is a table for illustrating the matrix depicting the permission to acquire the lock of the shared resource. In FIG. 16, "Y" denotes that the lock is allowed to be acquired and "N" denotes that the lock is not allowed to be acquired. If, for example, the combination of the mode of a lock to be newly acquired by the task and the mode of a current lock acquired by another task is "N" in the matrix, the task waits until the lock acquired by the another task is released. When the lock is released and the combination of the modes is "Y" in the matrix, the task acquires the lock in the new mode.

When the shared resource is to be used with the matrix such as that illustrated in FIG. 16, the task that attempts to acquire the lock newly in the "exclusive mode" is occasionally not able to acquire the lock within a limited period of time. Assume, for example, a case in which a task B has acquired the lock in the "shared mode" when a task A attempts to acquire the lock in the "exclusive mode". In this case, the combination of the modes is "N" in the matrix illustrated in FIG. 16 and the task A waits until the task B releases the lock.

If another task B2 attempts to acquire the lock in the "shared mode" before the task B releases the lock, the combination of the modes is "Y" on the matrix, so that the task B2 acquires the lock in the "shared mode" ahead of the task A. If such a task that attempts to acquire the lock in the "shared mode" continues to occur, the task A that attempts to acquire the lock in the "exclusive mode" is unable to acquire the lock within the limited period of time and continues to wait.

A known technique thus causes a new task to acquire the lock in the "exclusive mode", if the new task attempts to acquire the lock in the "exclusive mode" when the current lock mode is the "shared mode". Such a technique permits a task that attempts to acquire newly the lock in the "exclusive mode" to acquire the lock in the "exclusive mode", if the current mode is the "shared mode". The task that has acquired the lock in the "exclusive mode" then waits without using the shared resource until the task that has acquired the lock in the "shared mode" releases the lock.

The task that has acquired the lock in the "exclusive mode" uses the shared resource when the task that has acquired the lock in the "shared mode" thereafter releases the lock. Through the foregoing processing, the task that attempts to acquire the lock in the "exclusive mode" prevents any task that thereafter attempts to acquire the lock in the "shared mode" from acquiring the lock, being able to use the shared resource within the limited period of time.

Patent Document 1: Japanese Patent No. 2898012
Patent Document 2: Japanese Laid-open Patent Publication No. 03-083142

The known technique that enables acquisition of the lock in the "exclusive mode" when the current lock mode is the "shared mode", however, involves a problem of a deadlock that occurs if a single task can acquire the lock in duplicate.

FIG. 17 is a diagram for illustrating occurrence of a deadlock. In the example illustrated in FIG. 17, lock acquiring processes by a task 30 and a task 31 are to proceed vertically from top downward. As illustrated by (A) in FIG. 17, if the task 30 attempts to acquire the lock in the "shared mode" when the lock mode is "released", the task 30 acquires the lock in the "shared mode" as illustrated by (B) in FIG. 17.

As illustrated by (C) in FIG. 17, if the task 31 attempts to acquire the lock in the "exclusive mode" when the task 30 has acquired the lock in the "shared mode", the task 31 acquires the lock in the "exclusive mode" as illustrated by (D) in FIG. 17. Then, the task 31 waits for the task 30 to release the lock, without using the shared resource.

If the task 30 attempts to acquire the lock in duplicate in the "shared mode" as illustrated in (E) in FIG. 17, the task 30 waits for the task 31 to release the lock because the current lock mode is "exclusive mode" as illustrated by (F) in FIG. 17. This results in the task 30 waiting for the task 31 to release the lock and the task 31 waiting for the task 30 to release the lock. Then, as illustrated by (G) in FIG. 17, neither the process by the task 30 nor the process by the task 31 proceeds, causing a deadlock.

To prevent such a deadlock from occurring, a technique may be adopted to prohibit acquisition of the lock in duplicate by a single task. To prevent a single task from acquiring the lock in duplicate, however, the mode of the lock acquired by each task is to be stored in memory and a logic that skips acquisition of the lock in duplicate is to be incorporated in each task, which makes implementation complicated and troublesome. In addition, each task is very often developed separately, which makes it difficult to thoroughly avoid acquisition of the lock in duplicate by the single task.

SUMMARY

According to an aspect of an embodiment, a lock control apparatus includes a control unit that controls acquisition of a lock for using a shared resource shared among a plurality of tasks by a task according to first lock information that indicates whether to permit the tasks to acquire the lock, and a determining unit that determines whether there is a conflict of requests for acquisition of the lock by the tasks, wherein when the determining unit determines that there is a conflict of requests for acquisition of the lock, the control unit controls acquisition of the lock by the tasks according to second lock information that indicates whether to permit acquisition of the lock when there is a conflict.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram for illustrating a resource management apparatus according to a first embodiment;

FIG. 2 is a diagram for illustrating an example asymmetric matrix;

DESCRIPTION OF EMBODIMENTS

Figures 3, 4:
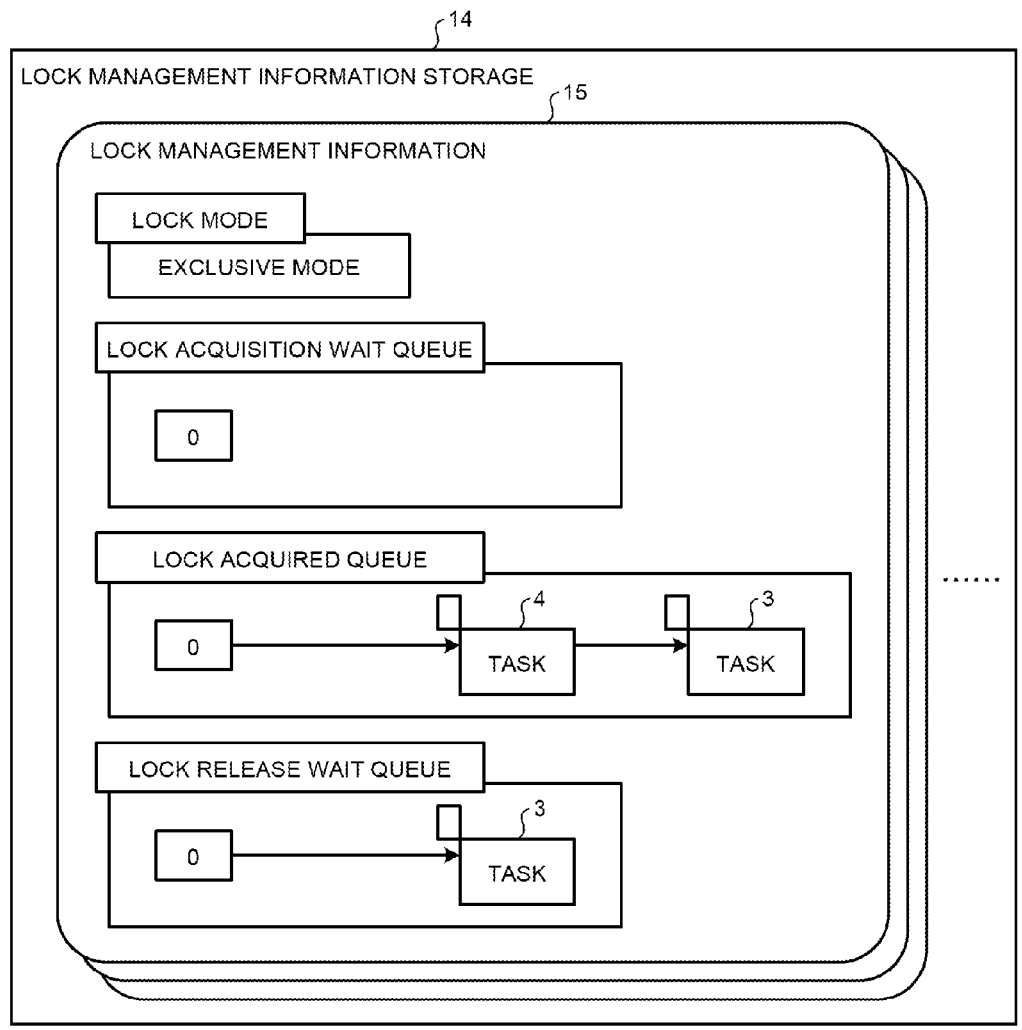
FIG. 3 is a diagram for illustrating an example temporary matrix.
FIG. 4 is a diagram for illustrating example lock management information.

Preferred embodiments of the present invention will be explained with reference to accompanying drawings.

[a] First Embodiment

A first embodiment will be described below for an example resource management apparatus including a lock control apparatus with reference to FIG. 1. FIG. 1 is a diagram for illustrating a resource management apparatus according to the first embodiment. This resource management apparatus 1 manages a plurality of shared resources shared by a plurality of tasks.

As illustrated in FIG. 1, the resource management apparatus 1 includes an asymmetric matrix storage 10, a temporary matrix storage 12, a lock management information storage 14, and a lock control apparatus 20. The asymmetric matrix storage 10 has an asymmetric matrix 11. The temporary matrix storage 12 has a temporary matrix 13. The lock management information storage 14 has lock management information 15. The lock control apparatus 20 includes a lock request processor 21, a conflict determiner 22, and a lock release processor 23.

The asymmetric matrix storage 10 has the asymmetric matrix 11 that indicates whether to permit acquisition of a lock by a task for using a shared resource. Specifically, the asymmetric matrix storage 10 has the asymmetric matrix 11 that associates the combination of the mode of a lock currently acquired by a task and the mode of a lock newly requested for acquisition by another task with the permission of the acquisition of the lock.

FIG. 2 is a diagram for illustrating an example asymmetric matrix. As illustrated in FIG. 2, the asymmetric matrix 11 assigns the mode of a lock currently acquired to each row and the mode of a lock newly requested for acquisition by a task to each column.

It is here noted that, in FIG. 2, an "exclusive mode" refers to a lock mode in which only a task that has acquired the lock uses a shared resource, while a "shared mode" refers to a lock mode in which any task other than the task that has acquired the lock is also permitted to refer to the shared resource. In FIG. 2, "Released" refers to a state in which, when a task that has acquired a lock releases the lock of the resource, there are no other tasks that have acquired the lock of the same resource. It is noted that only the task that has acquired the lock to be released can release the lock.

In FIG. 2, "N" denotes that acquisition of a lock by a new task is not permitted and "Y" denotes that acquisition of a lock by a task that has requested the acquisition of the lock is permitted. Additionally, in FIG. 2, "Y (wait)" denotes that, while the acquisition of a lock by a task that has requested the acquisition of the lock is permitted, the task that has requested the acquisition of the lock is made to wait in a queue for using or referring to a shared resource until the task that has currently acquired the lock releases the lock.

Specifically, the example asymmetric matrix 11 illustrated in FIG. 2 indicates that, when the mode of a lock currently acquired by a task is the "exclusive mode" and if the mode of a lock requested by another task is the "exclusive mode", the acquisition of the lock by the another task that has requested for the acquisition of the lock is not permitted. Similarly, the asymmetric matrix 11 indicates that, when the mode of a lock currently acquired by a task is the "exclusive mode" and if the mode of a lock requested by another task is the "shared mode", the acquisition of the lock by the another task that has requested for the acquisition of the lock is not permitted. Alternatively, the asymmetric matrix 11 indicates that, when the mode of a lock currently acquired by a task is the "shared mode", the acquisition of the lock by another task that has requested the acquisition of the lock is permitted regardless of the mode of the lock of which the another task has requested the acquisition.

It is to be noted, however, that the asymmetric matrix 11 indicates that, when the mode of a lock currently acquired by a task is the "shared mode" and if the mode of a lock requested by another task is the "exclusive mode", the following restrictions are imposed on the tasks. Specifically, the asymmetric matrix 11 indicates that, while the acquisition of a lock by the another task that has requested the acquisition of the lock is permitted, the another task that has requested the acquisition of the lock is made to wait in a queue for using the shared resource until the task that has currently acquired the lock releases the lock.

Reference is made back to FIG. 1. The temporary matrix storage 12 has the temporary matrix 13 that indicates whether to permit acquisition of a lock when a conflict of requests for acquisition of the lock exists relative to a shared resource. The "conflict" refers to the following situation. Specifically, a task requests acquisition of a lock in the "shared mode" and another task requests acquisition of a lock in the "exclusive mode"; thereafter, the task that has requested the acquisition of the lock in the "shared mode" requests in duplicate the acquisition of the lock in the "shared mode".

Specifically, the temporary matrix storage 12 has the temporary matrix 13 that, as with the asymmetric matrix 11, associates the combination of the mode of a lock currently acquired by a task and the mode of a lock newly requested for acquisition by another task with the permission of the acquisition of the lock.

FIG. 3 is a diagram for illustrating an example temporary matrix. In FIG. 3, "Y (retained in the exclusive mode)" denotes that, while acquisition of a lock by a new task is permitted, the currently acquired lock is retained in the "exclusive mode". Specifically, the temporary matrix 13 indicates that, while the task that has acquired the lock in the "exclusive mode" is kept in a wait queue, the task that has requested acquisition of the lock in the "shared mode" is permitted to browse the shared resource.

As illustrated in FIG. 3, the temporary matrix 13 indicates that, if the mode of a lock currently acquired by a task is the "exclusive mode" and the mode requested for acquisition by another task is the "exclusive mode", the acquisition of the lock by the another task that has requested the acquisition of the lock is not permitted. Similarly, the temporary matrix 13 indicates that, if the mode of a lock currently acquired by a task is the "exclusive mode" and the mode of a lock requested for acquisition by another task is the "shared mode", the another task that has requested the acquisition of the lock is permitted to acquire the lock in the "shared mode".

It is to be noted, however, that the temporary matrix 13 indicates that, if the mode of a lock currently acquired by a task is the "exclusive mode" and the mode of a lock requested for acquisition by another task is the "shared mode", the following restrictions are imposed on the tasks. Specifically, the temporary matrix 13 has information that indicates that, while the mode of the lock currently acquired by the task is retained in the "exclusive mode", the another task that has requested the acquisition of the lock is permitted to acquire the lock in the "shared mode". Specifically, the temporary matrix 13 has information that indicates that the another task that has requested the acquisition of the lock is permitted to refer to the shared resource.

Reference is made back to FIG. 1. The lock management information storage 14 has the lock management information 15 that indicates current lock states relating to the shared resources managed by the resource management apparatus 1. FIG. 4 is a diagram for illustrating example lock management information. In the example illustrated in FIG. 4, the lock management information 15 has, as information indicating the state of a lock, "lock mode", "lock acquisition wait queue", "lock acquired queue", and "lock release wait queue". The lock management information storage 14 has information similar to the lock management information 15 individually for each of the shared resources managed by the resource management apparatus 1.

Of the lock management information 15, the "lock mode" indicates that, for the shared resources supported by the lock management information 15, the mode of a lock currently acquired by a task is the "exclusive mode", the "shared mode", or "released". Specifically, the "lock mode" is information that indicates the mode of the currently acquired lock for the supported shared resource. Similarly, the "lock acquisition wait queue" is information that indicates a task waiting to acquire a lock for the supported shared resource. The "lock acquired queue" is information that indicates a task that has acquired a lock for the supported shared resource. The "lock release wait queue" is information that indicates a task that waits for the acquired lock to be released for the supported shared resource.

For example, in the example illustrated in FIG. 4, the lock management information 15 indicates that the mode of a lock currently acquired by a task is the "exclusive mode". The lock management information 15 does not have information stored in the "lock acquisition wait queue" and has information indicating "task 4" and "task 3" stored in the "lock acquired queue". The lock management information 15 also has information indicating "task 3" in the "lock release wait queue".

The lock management information storage 14 has lock management information similar to the lock management information 15 for each of the shared resources. In the description that follows, each of the tasks 2 to 4 requests acquisition of a lock for a shared resource supported by the lock management information 15.

Reference is made back to FIG. 1. The lock control apparatus 20 controls acquisition of the lock by each of the tasks 2 to 4 according to the asymmetric matrix 11. The lock control apparatus 20 further determines whether there is a conflict of requests for acquisition of the lock by the tasks 2 to 4. If determining that there is a conflict, the lock control apparatus 20 controls the acquisition of the lock according to the temporary matrix 13.

The lock request processor 21, the conflict determiner 22, and the lock release processor 23 included in the lock control apparatus 20 will be described below. The lock request processor 21 controls the acquisition of the lock by each of the tasks 2 to 4 according to the asymmetric matrix 11 stored in the asymmetric matrix storage 10. If the conflict determiner 22 determines that there is a conflict of requests, the lock request processor 21 controls the acquisition of the lock by each of the tasks 2 to 4 according to the temporary matrix 13.

Specifically, when any of the tasks 2 to 4 requests acquisition of a lock, the lock request processor 21 determines whether the mode of the lock of which the acquisition is requested is the "shared mode". If the mode of the lock of which the acquisition is requested is not the "shared mode", the lock request processor 21 refers to the asymmetric matrix 11 and determines the permission of the acquisition of the lock according to the requested lock mode and the "lock mode" of the lock management information 15.

If the mode of the lock of which the acquisition is requested is the "shared mode", the lock request processor 21 calls the conflict determiner 22 to determine whether there is a conflict. If notified by the conflict determiner 22 that there is a conflict, the lock request processor 21 refers to the temporary matrix 13 and determines the permission of the acquisition of the lock according to the requested lock mode and the "lock mode" of the lock management information 15. Alternatively, if notified by the conflict determiner 22 that there is occurring no conflict, the lock request processor 21 refers to the asymmetric matrix 11 and thereby determines the permission of the acquisition of the lock.

When determining the permission of the acquisition of the lock, the lock request processor 21 determines the "lock mode" of the lock management information 15 to be the mode of a lock currently acquired by a task. The lock request processor 21 also refers to the asymmetric matrix 11 or the temporary matrix 13 to determine the permission of the acquisition of the lock associated with the combination of the determined lock mode and the requested lock mode. If the result of the reference is "N", the lock request processor 21 sets the task that has requested the acquisition of the lock in the wait state and places the task at the end of the "lock acquisition wait queue" of the lock management information 15.

If the result of the reference is "Y", the lock request processor 21 changes the "lock mode" of the lock management information 15 to the requested lock mode. Additionally, the lock request processor 21 places the task that has requested the acquisition of the lock at the end of the "lock acquired queue" of the lock management information 15.

If the result of the reference is "Y (wait)", the lock request processor 21 sets the task that has newly requested the acquisition of the lock in the wait state and places the task that has newly requested the acquisition of the lock at the end of the "lock release wait queue" of the lock management information 15. The lock request processor 21 also changes the "lock mode" of the lock management information 15 to the mode of the lock requested by the task that has newly requested the acquisition of the lock.

If the result of the reference is "Y (retained in the exclusive mode)", the lock request processor 21 does not change the "lock mode" of the lock management information 15 and places the task that has newly requested the acquisition of the lock at the end of the "lock acquired queue" of the lock management information 15. Specifically, the lock request processor 21 causes the task that has newly requested the acquisition of the lock to acquire the lock in the shared mode and, without changing the "lock mode" of the lock management information 15, retains the exclusive mode for the "lock mode".

As such, if the mode of a lock currently acquired by a task is the "shared mode" and a new task requests the acquisition of the lock in the "exclusive mode", the lock request processor 21 causes the new task to acquire the lock in the "exclusive mode". Additionally, the lock request processor 21 causes the new task to wait for using the shared resource until the task that has acquired the lock in the "shared mode" releases the lock.

If the mode of the lock currently acquired by a task is the "exclusive mode" and a task that has already acquired the lock in the "shared mode" requests acquisition of the lock in duplicate in the "shared mode", the lock request processor 21 has the conflict determiner 22 determine whether there is a conflict. If the conflict determiner 22 determines that there is a conflict, the lock request processor 21 permits the task that has requested the acquisition of the lock in duplicate to refer to the shared resource, while retaining the "exclusive mode" for the lock mode. Specifically, the lock request processor 21 permits the task that has requested the acquisition of the lock in duplicate to acquire the lock in the "shared mode", without changing the "lock mode" of the lock management information 15.

The conflict determiner 22 determines whether there is a conflict of requests for acquisition of the lock by the tasks 2 to 4. Specifically, the conflict determiner 22 determines that there is a conflict, if there is a task that has acquired a lock in the "exclusive mode" and waits in a queue when another task newly acquires a lock in the "shared mode", and if the another task that has newly acquired the lock in the "shared mode" requests acquisition of a lock in the "shared mode" again.

Specifically, the conflict determiner 22, when called from the lock request processor 21, determines whether the "lock mode" of the lock management information 15 is the "exclusive mode". If the "lock mode" of the lock management information 15 is the "exclusive mode", the conflict determiner 22 determines whether the task is placed on the "lock release wait queue" of the lock management information 15. If the task is placed on the "lock release wait queue" of the lock management information 15, the conflict determiner 22 determines whether the task that has newly requested the acquisition of the lock is placed on the "lock acquired queue" of the lock management information 15.

If the task that has newly requested the acquisition of the lock is placed on the "lock acquired queue" of the lock management information 15, the conflict determiner 22 determines that there is a conflict and notifies the lock request processor 21 of the occurrence of the conflict. If the "lock mode" of the lock management information 15 is not the "exclusive mode" and the task is not placed on the "lock release wait queue" of the lock management information 15, the conflict determiner 22 determines that there is no conflict and notifies the lock request processor 21 that there is no conflict. If the task that has newly requested the acquisition of the lock is not placed on the "lock acquired queue" of the lock management information 15, the conflict determiner 22 determines that there is no conflict and notifies the lock request processor 21 that there is no conflict.

The lock release processor 23 causes a task that has been waiting for a lock to be released to acquire the lock, if a task that has completed using or referring to the shared resource releases the lock. Specifically, when a task that has been using or referring to the shared resource releases the lock, the lock release processor 23 deletes the task that has released the lock from the "lock acquired queue" of the lock management information 15. If there are any tasks placed on the "lock acquired queue" of the lock management information 15, the lock release processor 23 determines whether all of the tasks in the "lock acquired queue" of the lock management information 15 exist in the "lock release wait queue" of the lock management information 15.

If determining that all of the tasks in the "lock acquired queue" of the lock management information 15 exist in the "lock release wait queue" of the lock management information 15, the lock release processor 23 releases the wait state of the tasks in the "lock release wait queue". Specifically, the lock release processor 23 causes the tasks placed on the "lock release wait queue" to use or refer to the shared resource.

If any of the tasks in the "lock acquired queue" of the lock management information 15 does not exist in the "lock release wait queue" of the lock management information 15, the lock release processor 23 directly terminates the process. If no tasks exist in the "lock acquired queue" of the lock management information 15, the lock release processor 23 changes the "lock mode" of the lock management information 15 to "released". Additionally, the lock release processor 23 releases the wait state of the task placed on the "lock acquisition wait queue" and prompts the task to request acquisition of the lock again.

The following describes example processing performed by the lock request processor 21, the conflict determiner 22, and the lock release processor 23 included in the lock control apparatus 20. In the example to be described below, the task 3 requests acquisition of a lock in the "exclusive mode" when the task 4 has acquired a lock in the "shared mode" and the task 4 thereafter requests acquisition of a lock in the "shared mode" in duplicate.

If, for example, the task 4 requests acquisition of a lock in the "shared mode" when the "lock mode" of the lock management information 15 is "released", the lock request processor 21 calls the conflict determiner 22 to determine whether there is a conflict.

In such a case, the "lock mode" of the lock management information 15 is not the "exclusive mode" and the conflict determiner 22 determines that there is no conflict and notifies the lock request processor 21 that there is no conflict.

Thus, the lock request processor 21 refers to the asymmetric matrix 11 and determines that the permission of the acquisition of the lock associated with the combination of the current lock mode "released" and the "shared mode" in which the task 4 has requested the acquisition of the lock is "Y". Then, the lock request processor 21 changes the "lock mode" of the lock management information 15 to the "shared mode" and places the task 4 on the "lock acquired queue" of the lock management information 15. The task 4, being the first of the tasks placed on the "lock acquired queue", refers to the shared resource.

Next, when the task 3 has requested the acquisition of the lock in the "exclusive mode", the lock request processor 21 refers to the asymmetric matrix 11. The lock request processor 21 then determines that the permission of the acquisition of the lock associated with the combination of the "shared mode" that represents the mode of the lock currently acquired by the task 4 and the "exclusive mode" requested by the task 3 is "Y (wait)".

Thus, the lock request processor 21 sets the task 3 in the wait state and places the task 3 on the "lock release wait queue" of the lock management information 15. The lock request processor 21 changes the "lock mode" of the lock management information 15 to the "exclusive mode" that represents the mode of the lock requested by the task 3. Specifically, at this point in time, the task 4 is placed first, and followed by the task 3, on the "lock acquired queue" of the lock management information 15.

Next, if the task 4 has requested acquisition of a lock in the "shared mode" in duplicate, the lock request processor 21 calls the conflict determiner 22 to determine whether there is a conflict. In such a case, the conflict determiner 22 determines that the "lock mode" of the lock management information 15 is the "exclusive mode", the task 3 is placed on the "lock release wait queue", and the task 4 that has requested the acquisition of the lock is placed on the "lock acquired queue". Thus, the conflict determiner 22 determines that there is a conflict and notifies the lock request processor 21 of the occurrence of the conflict.

Thus, the lock request processor 21 refers to the temporary matrix 13 and determines that the permission of the acquisition of the lock associated with the combination of the "exclusive mode" indicated by the lock management information 15 and the "shared mode" in which the task 4 has requested the acquisition of the lock is "Y (retained in the exclusive mode)". The lock request processor 21 then places the task 4 at the end of the "lock acquired queue" of the lock management information 15.

Specifically, the lock request processor 21 does not change the "lock mode" of the lock management information 15 and places the task 4 on only the "lock acquired queue" of the lock management information 15. It is noted that, though the task 3 and the task 4 are placed on the "lock acquired queue" of the lock management information 15, the task 3 waits in the queue and does not use the shared resource.

The task 4 refers to the shared resource and, on completing referring to the shared resource, releases the lock. Then, the lock release processor 23 deletes the task 4 from the "lock acquired queue" and releases the wait state of the task 3 in the "lock release wait queue". Thus, the task 3 uses the shared resource in the "exclusive mode" and thereafter releases the lock.

Figure 5:
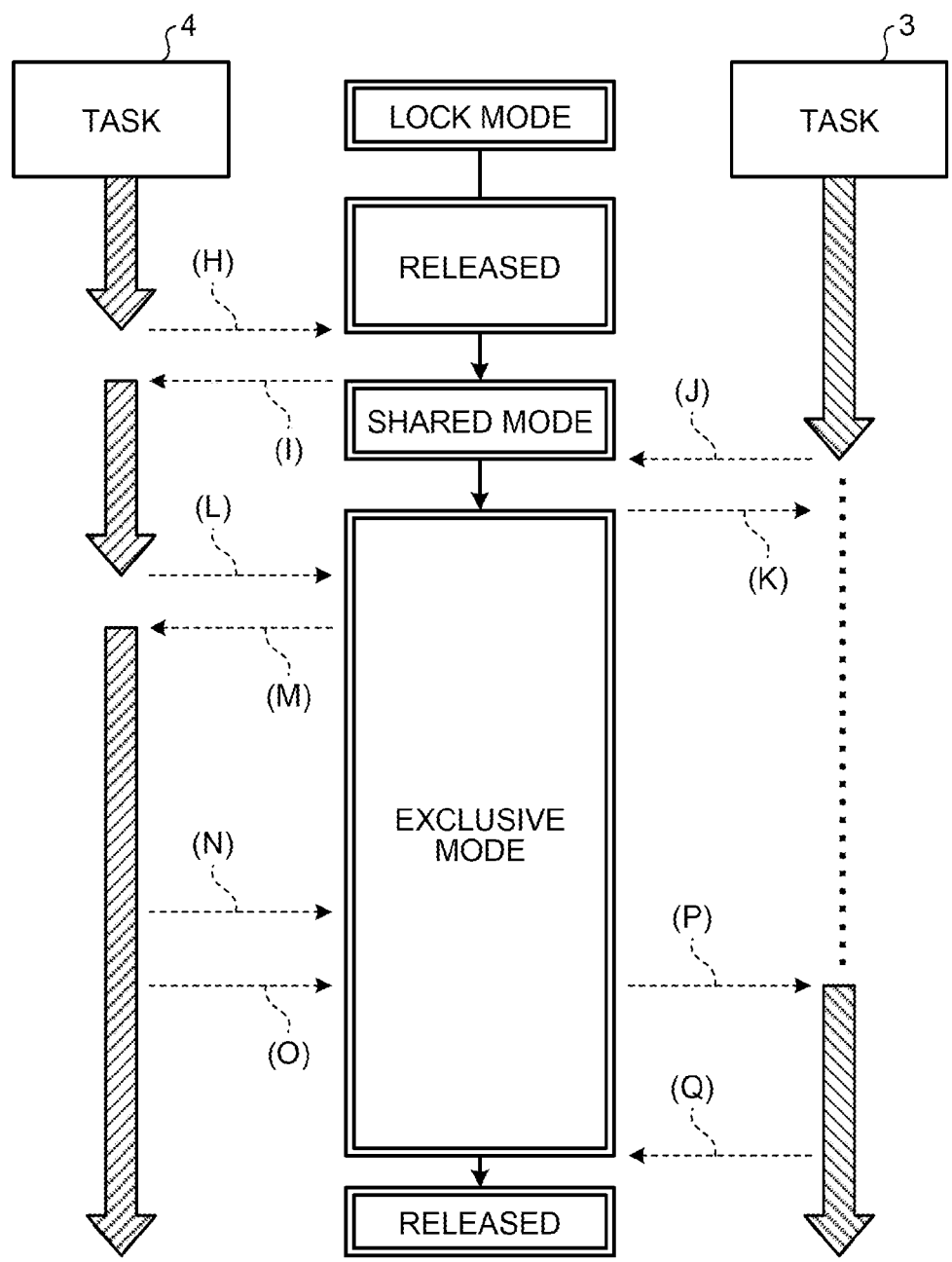
FIG. 5 is a diagram for illustrating transition of a lock mode.

FIG. 5 is a diagram for illustrating transition of the lock mode. The example illustrated in FIG. 5 depicts that, from top downward, the task 4 requests acquisition of a lock in the "shared mode", the task 3 then requests acquisition of a lock in the "exclusive mode", and thereafter the task 4 requests acquisition of a lock in the "shared mode" in duplicate. In FIG. 5, "lock mode" means the "lock mode" of the lock management information 15.

As indicated by (H) in FIG. 5, the task 4 requests acquisition of a lock in the "shared mode". In such a case, the lock control apparatus 20 causes the task 4 to acquire the lock in the "shared mode" as indicated by (I) in FIG. 5. The lock control apparatus 20 also changes the lock mode to the "shared mode".

As indicated by (J) in FIG. 5, the task 3 requests acquisition of a lock in the "exclusive mode". In such a case, the lock control apparatus 20 causes the task 3 to acquire the lock in the "exclusive mode" as indicated by (K) in FIG. 5 and to wait in a queue for using the shared resource until the task 4 releases the lock. The lock control apparatus 20 also changes the lock mode to the "exclusive mode".

Then, as indicated by (L) in FIG. 5, the task 4 requests acquisition of a lock in the "shared mode" in duplicate. In such a case, the lock control apparatus 20 determines that there is a conflict and, by referring to the temporary matrix 13, determines the permission of the acquisition of the lock. Then, as indicated by (M) in FIG. 5, the lock control apparatus 20 causes the task 4 to acquire the lock in duplicate in the "shared mode", while retaining the "exclusive mode" for the lock mode.

Thus, the task 4 refers to the shared resource and, as indicated by (N) and (O) in FIG. 5, releases the lock in duplicate. Then, as indicated by (P) in FIG. 5, the task 3 uses the shared resource in the "exclusive mode". Thereafter, as indicated by (Q) in FIG. 5, the task 3 completes using the shared resource and releases the lock. Thus, the lock control apparatus 20 changes the lock mode to "released".

As described above, the lock control apparatus 20 controls acquisition of a lock according to the asymmetric matrix 11 when there is no conflict and according to the temporary matrix 13 when there is a conflict. This enables the lock control apparatus 20 to prevent a deadlock as a result of a conflict occurring.

The lock request processor 21, the conflict determiner 22, and the lock release processor 23 may, for example, be each an electronic circuit. Nonlimiting examples of the electronic circuit include integrated circuits such as application specific integrated circuits (ASICs) and field programmable gate arrays (FPGAs), central processing units (CPUs), and microprocessing units (MPUs).

The asymmetric matrix storage 10, the temporary matrix storage 12, and the lock management information storage 14 may be each a storage device, such as a semiconductor memory device including a random access memory (RAM), a read only memory (ROM), and a flash memory.

Processing Steps

Figure 6:
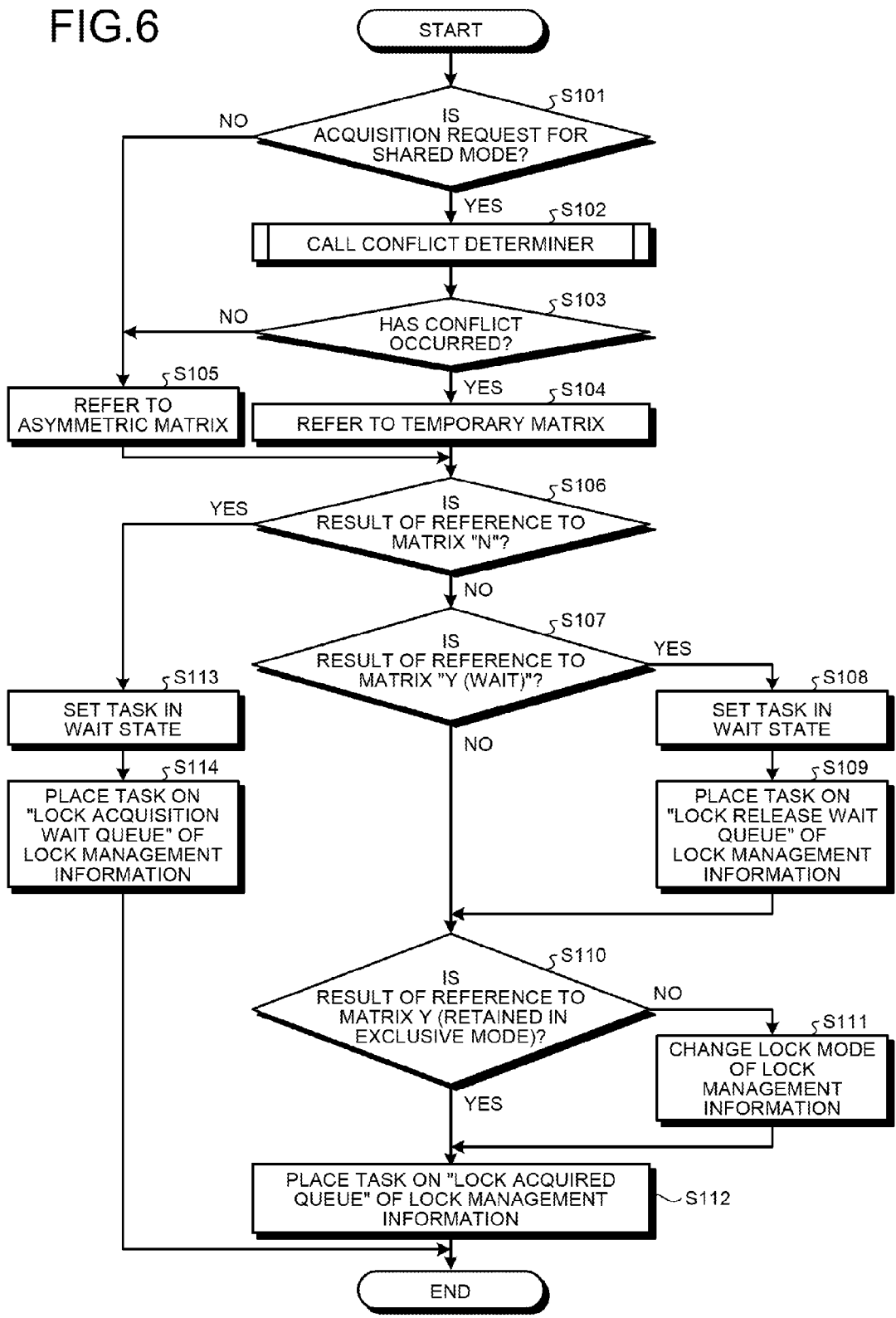
FIG. 6 is a flowchart for illustrating steps performed by a lock request processor according to the first embodiment.
Figure 7:
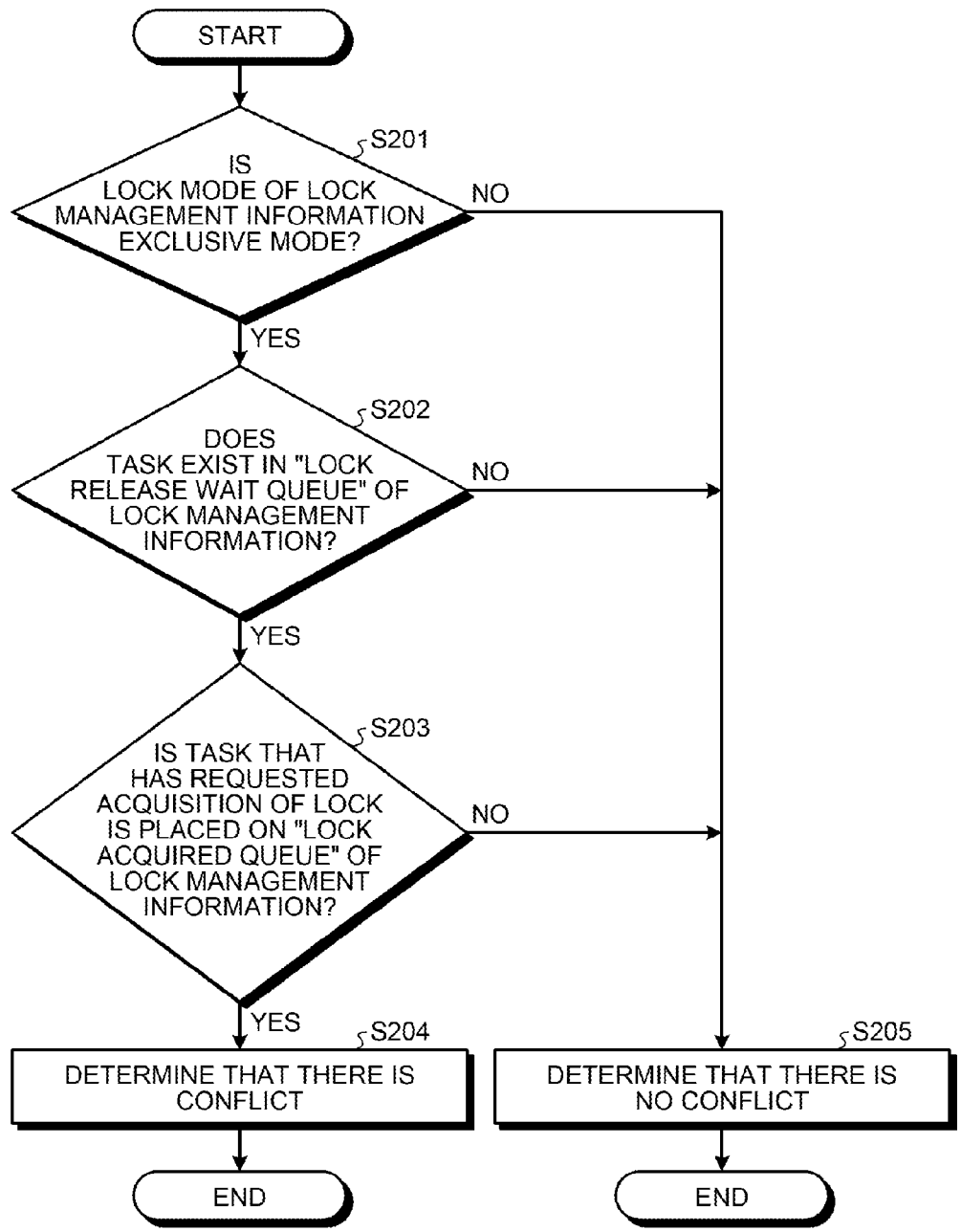
FIG. 7 is an example flowchart for illustrating steps performed by a conflict determiner according to the first embodiment.
Figure 8:
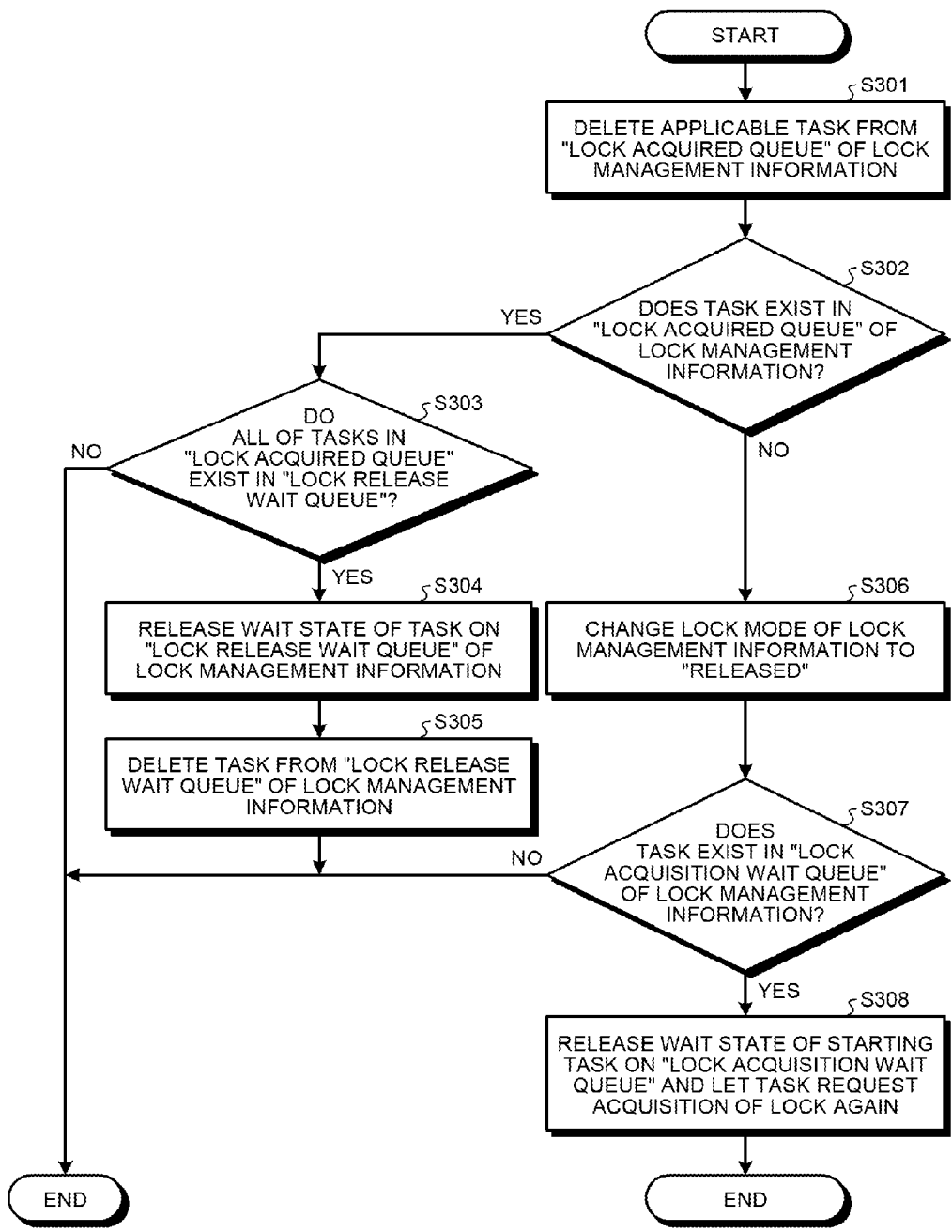
FIG. 8 is an example flowchart for illustrating steps performed by a lock release processor according to the first embodiment.

The following describes processing steps performed by the lock request processor 21, the conflict determiner 22, and the lock release processor 23 included in the lock control apparatus 20 with reference to FIGS. 6 to 8. The processing steps performed by the lock request processor 21 will first be described with reference to FIG. 6. FIG. 6 is a flowchart for illustrating the processing steps performed by the lock request processor 21 according to the first embodiment. The lock request processor 21 starts its processing steps by using a request made for acquisition of a lock by each of the tasks 2 to 4 as a trigger.

The lock request processor 21 first determines whether the mode of the lock of which the acquisition is requested by each of the tasks 2 to 4 is the "shared mode" (Step S101). If the mode of the lock of which the acquisition is requested by each of the tasks 2 to 4 is the "shared mode" (Yes at Step S101), the lock request processor 21 calls the conflict determiner 22 to determine whether there is a conflict (Step S102).

Next, the lock request processor 21 determines whether the conflict determiner 22 has determined that there is a conflict (Step S103). If the conflict determiner 22 has determined that there is a conflict (Yes at Step S103), the lock request processor 21 refers to the temporary matrix 13 (Step S104). Specifically, the lock request processor 21 refers to the temporary matrix 13 to determine the permission of the acquisition of the lock associated with the combination of the "lock mode" of the lock management information 15 and the mode of the lock of which the acquisition is requested by each of the tasks 2 to 4.

If the mode of the lock of which the acquisition is requested by each of the tasks 2 to 4 is not the "shared mode" (No at Step S101), the lock request processor 21 refers to the asymmetric matrix 11 (Step S105). Similarly, if the conflict determiner 22 has determined that there is no conflict (No at Step S103), the lock request processor 21 refers to the asymmetric matrix 11 (Step S105). Specifically, the lock request processor 21 refers to the asymmetric matrix 11 to determine the permission of the acquisition of the lock associated with the combination of the "lock mode" of the lock management information 15 and the mode of the lock of which the acquisition is requested by each of the tasks 2 to 4.

The lock request processor 21 then determines whether the result of the reference to the asymmetric matrix 11 or the temporary matrix 13 is "N" (Step S106). If the result of the reference is not "N" (No at Step S106), the lock request processor 21 determines whether the result of the reference is "Y (wait)" (Step S107). If the result of the reference is "Y (wait)" (Yes at Step S107), the lock request processor 21 sets the task that has requested the acquisition of the lock in the wait state (Step S108) and places the task on the "lock release wait queue" of the lock management information 15 (Step S109). It is noted that Step S108 and Step S109 may be performed in reverse sequence.

The lock request processor 21 then determines whether the result of the reference is "Y (retained in the exclusive mode)" (Step S110). If determining that the result of the reference to the matrix is not "Y (retained in the exclusive mode)" (No at Step S110), the lock request processor 21 changes the "lock mode" of the lock management information 15 (Step S111). Specifically, the lock request processor 21 changes the "lock mode" of the lock management information 15 to the mode of the lock of which the acquisition is requested by the tasks 2 to 4. The lock request processor 21 places the task that has requested the acquisition of the lock on the "lock acquired queue" of the lock management information 15 (Step S112) and terminates the process.

If determining that the result of the reference to the asymmetric matrix 11 or the temporary matrix 13 is not "Y (wait)" (No at Step S107), the lock request processor 21 determines whether the result of the reference is "Y (retained in the exclusive mode)" (Step S110). If determining that the result of the reference is "Y (retained in the exclusive mode)" (Yes at Step S110), the lock request processor 21 places the task that has requested the acquisition of the lock on the "lock acquired queue" (Step S112) and terminates the process.

If determining that the result of the reference to the asymmetric matrix 11 or the temporary matrix 13 is "N" (Yes at Step S106), the lock request processor 21 sets the task that has requested the acquisition of the lock in the wait state (Step S113). The lock request processor 21 then places the task that has requested the acquisition of the lock on the "lock acquisition wait queue" of the lock management information 15 (Step S114) and terminates the process. It is noted that Step S113 and Step S114 may be performed in reverse sequence.

The processing steps performed by the conflict determiner 22 will be described below with reference to FIG. 7. FIG. 7 is an example flowchart for illustrating the processing steps performed by the conflict determiner 22 according to the first embodiment. The conflict determiner 22 starts its processing steps when its function is called from the lock request processor 21.

The conflict determiner 22 determines whether the "lock mode" of the lock management information 15 is the "exclusive mode" (Step S201). If determining that the "lock mode" of the lock management information 15 is the "exclusive mode" (Yes at Step S201), the conflict determiner 22 determines whether the task is placed on the "lock release wait queue" (Step S202).

If determining that the task is placed on the "lock release wait queue" (Yes at Step S202), the conflict determiner 22 then determines whether the task that has requested the acquisition of the lock is placed on the "lock acquired queue" of the lock management information 15 (Step S203). If determining that the task that has requested the acquisition of the lock is placed on the "lock acquired queue" of the lock management information 15 (Yes at Step S203), the conflict determiner 22 determines that there is a conflict (Step S204). Thereafter, the conflict determiner 22 notifies the lock request processor 21 of the occurrence of the conflict and terminates the process.

If determining that the "lock mode" of the lock management information 15 is not the "exclusive mode" (No at Step S201), the conflict determiner 22 determines that there is no conflict (Step S205) and notifies the lock request processor 21 that there is no conflict before terminating the process. If no task exists in the "lock release wait queue" of the lock management information 15 (No at Step S202), the conflict determiner 22 determines that there is no conflict (Step S205). If the task that has requested the acquisition of the lock is not placed on the "lock acquired queue" of the lock management information 15 (No at Step S203), the conflict determiner 22 determines that there is no conflict (Step S205).

The processing steps performed by the lock release processor 23 will be described below with reference to FIG. 8. FIG. 8 is an example flowchart for illustrating the steps performed by the lock release processor 23 according to the first embodiment. The lock release processor 23 starts its processing steps by using timing at which a task that has acquired a lock releases the lock as a trigger.

The lock release processor 23 deletes from the "lock acquired queue" of the lock management information 15 the task that has released the lock (Step S301). The lock release processor 23 next determines whether any task is placed on the "lock acquired queue" of the lock management information 15 (Step S302). If determining that a task is placed on the "lock acquired queue" (Yes at Step S302), the lock release processor 23 determines whether all of the tasks in the "lock acquired queue" of the lock management information 15 exist in the "lock release wait queue" (Step S303).

If determining that all of the tasks in the "lock acquired queue" of the lock management information 15 exist in the "lock release wait queue" (Yes at Step S303), the lock release processor 23 releases the wait state of the tasks placed on the "lock release wait queue" (Step S304). Thereafter, the lock release processor 23 deletes the tasks from the "lock release wait queue" (Step S305) and terminates the process. In contrast, if determining that any of the tasks in the "lock acquired queue" of the lock management information 15 does not exist in the "lock release wait queue" (No at Step S303), the lock release processor 23 terminates the process.

If determining that no task is placed on the "lock acquired queue" (No at Step S302), the lock release processor 23 changes the "lock mode" of the lock management information 15 to "released" (Step S306). Next, the lock release processor 23 determines whether any task is placed on the "lock acquisition wait queue" of the lock management information 15 (Step S307).

If determining that a task is placed on the "lock acquisition wait queue" (Yes at Step S307), the lock release processor 23 releases the wait state of the first task on the "lock acquisition wait queue" and lets the task request the acquisition of a lock again (Step S308). The lock release processor 23 thereafter terminates the process. Alternatively, if determining that no task is placed on the "lock acquisition wait queue" (No at Step S307), the lock release processor 23 terminates the process.

Effects of First Embodiment

As described heretofore, the lock control apparatus 20 according to the first embodiment controls acquisition of a lock of the shared resource by the tasks 2 to 4 according to the asymmetric matrix 11. The lock control apparatus 20 also determines whether there is a conflict of requests for acquisition of the lock by the tasks 2 to 4. If determining that there is a conflict of requests for acquisition of the lock by the tasks 2 to 4, the lock control apparatus 20 controls the acquisition of the lock of the shared resource by the tasks 2 to 4 according to the temporary matrix 13.

The lock control apparatus 20 thus can avoid a deadlock. Specifically, if there is a conflict of requests for acquisition of the lock by the tasks 2 to 4, the lock control apparatus 20 controls the acquisition of the lock by the tasks 2 to 4 according to the temporary matrix 13 that is set so as to avoid a deadlock. This enables the lock control apparatus 20 to prevent a deadlock.

In addition, the lock control apparatus 20 can prevent a deadlock without having to incorporate therein a logic that prohibits acquisition of a lock in duplicate by a single task. As a result, the lock control apparatus 20 facilitates implementation of each of the tasks 2 to 4.

The asymmetric matrix 11 indicates that the following processing is performed if the mode of a lock requested by a task is the "exclusive mode" when the "lock mode" of the lock management information 15 is the "shared mode". Specifically, the asymmetric matrix 11 indicates that the task that has requested the acquisition of the lock is, while being permitted to acquire the lock in the "exclusive mode", made to wait in a queue for using the shared resource until a task that has acquired a lock in the "shared mode" releases the lock.

As a result, the lock control apparatus 20 achieves the following effect by controlling acquisition of a lock by the tasks 2 to 4 using the asymmetric matrix 11. Specifically, even if a task that attempts to acquire a lock in the "shared mode" continues to occur, the lock control apparatus 20 can permit a task that has acquired a lock in the "exclusive mode" to use the shared resource within a limited period of time.

Similarly, the temporary matrix 13 indicates that the following processing is performed if the mode of a lock requested by a task is the "shared mode" when the "lock mode" of the lock management information 15 is the "exclusive mode". Specifically, the temporary matrix 13 indicates that, while the task that has requested the acquisition of the lock is permitted to acquire the lock in the "shared mode", the "lock mode" of the lock management information 15 is retained in the "exclusive mode". To state the foregoing differently, the temporary matrix 13 indicates that, while the mode of a lock currently acquired by a task is retained as is, a task that has requested acquisition of a lock in the "shared mode" is permitted only to refer to the shared resource. Consequently, the lock control apparatus 20 can adequately prevent a deadlock when a conflict occurs by controlling acquisition of a lock according to the temporary matrix 13 during the occurrence of the conflict.

In addition, the lock control apparatus 20 determines that a conflict has occurred, if there is a task that has acquired a lock in the "exclusive mode" when the "lock mode" of the lock management information 15 is the "shared mode", and if the following condition is thereafter satisfied. Specifically, the lock control apparatus 20 determines that a conflict has occurred, if the task that has acquired the lock in the "shared mode" requests acquisition of a lock in the "shared mode" in duplicate. Thus, the lock control apparatus 20 can adequately determine the occurrence of a conflict and thus can avoid a deadlock.

[b] Second Embodiment

The lock control apparatus 20 described above determines whether there is a conflict according to the requests for acquisition of a lock by the tasks 2 to 4. This is, however, not the only possible embodiment and another method may be used to determine whether there is a conflict of requests for acquisition of a lock.

Figure 9:
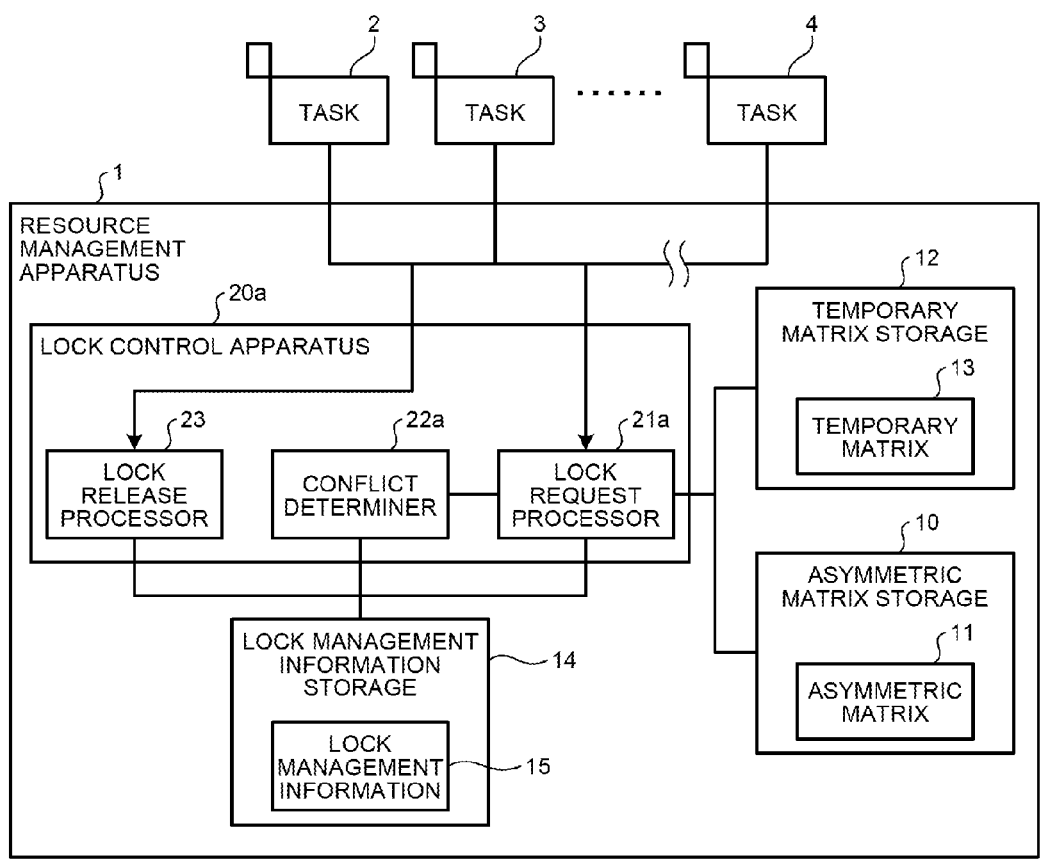
FIG. 9 is a diagram for illustrating a resource management apparatus according to a second embodiment.

FIG. 9 is a diagram for illustrating a resource management apparatus according to a second embodiment. Of reference numerals 1 to 4, 10 to 15, and 20 to 23 denoting elements illustrated in FIG. 9, like reference numerals are used as those used in FIG. 1 for those elements that perform similar processing as in the first embodiment and descriptions for those elements will be omitted.

For example, a lock control apparatus 20a according to the second embodiment includes a lock request processor 21a, a conflict determiner 22a, and the lock release processor 23. The lock control apparatus 20a determines that there is a conflict, if a task that has acquired a lock in the "shared mode" is kept waiting for another task that has acquired a lock in the "exclusive mode" to release the lock for the lapse of a predetermined period of time. Specifically, the lock control apparatus 20a determines that there is a conflict, if a task is kept waiting for the lapse of a predetermined period of time, and then determines the permission of the acquisition of a lock according to the temporary matrix 13.

Figure 10:
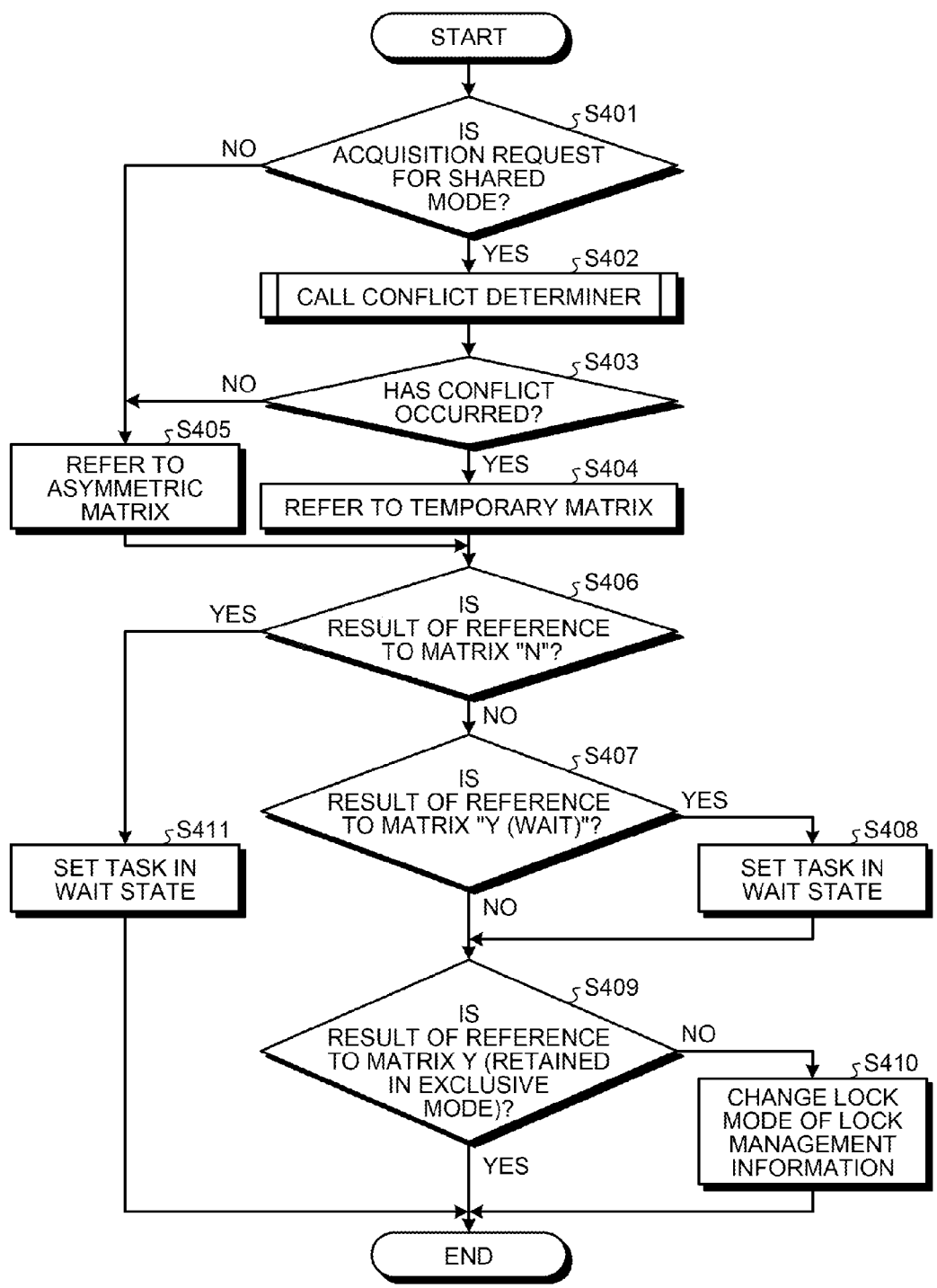
FIG. 10 is a flowchart for illustrating steps performed by a lock request processor according to the second embodiment.

The following describes processing performed by the lock request processor 21a and the conflict determiner 22a included in the lock control apparatus 20a. FIG. 10 is a flowchart for illustrating steps performed by the lock request processor according to the second embodiment. It is noted that, of steps illustrated in FIG. 10, Steps S401 to S407 are the same as Steps S101 to S107 in FIG. 6 and descriptions therefor will be omitted.

The lock request processor 21a according to the second embodiment sets a task in the wait state (Step S408), if the result of reference to the matrix is "Y (wait)" (Yes at Step S407). The lock request processor 21a next determines whether the result of reference to the matrix is "Y (retained in the exclusive mode)" (Step S409). If the result of reference to the matrix is "Y (retained in the exclusive mode)" (Yes at Step S409), the lock request processor 21a terminates the process.

If the result of reference to the matrix is not "Y (retained in the exclusive mode)" (No at Step S409), the lock request processor 21a changes the "lock mode" of the lock management information 15 according to the mode of the lock requested by the task (Step S410). If the result of reference to the matrix is "N" (Yes at Step S406), the lock request processor 21a sets the task in the wait state (Step S411) and terminates the process. If the result of reference to the matrix is not "Y (wait)" (No at Step S407), the lock request processor 21a determines whether the result of reference to the matrix is "Y (retained in the exclusive mode)" (Step S409).

Figure 11:
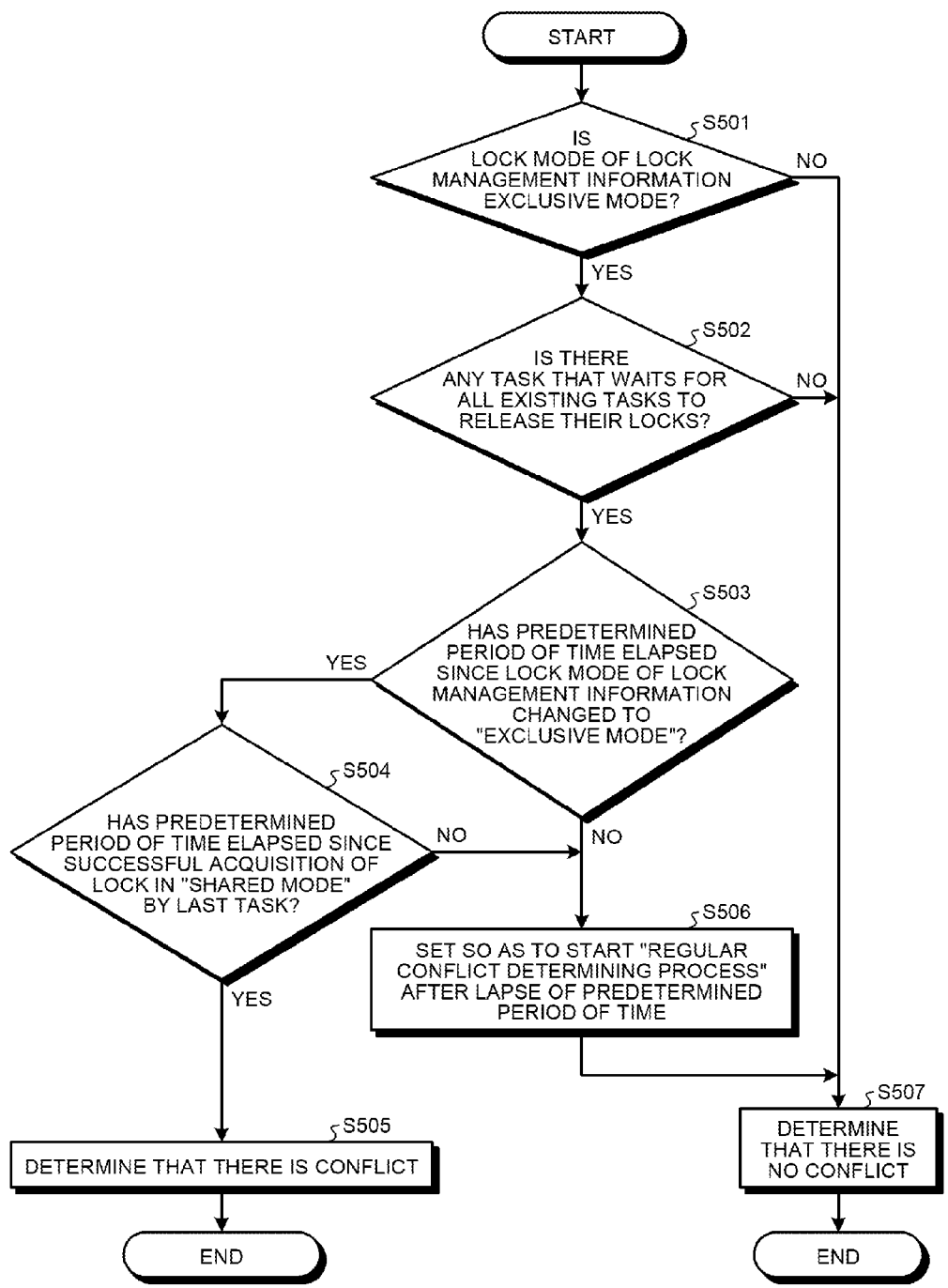
FIG. 11 is an example flowchart for illustrating a conflict determining process performed by a conflict determiner according to the second embodiment.

FIG. 11 is a flowchart for illustrating conflict determining process performed by the conflict determiner according to the second embodiment. The conflict determiner 22a according to the second embodiment first determines whether the "lock mode" of the lock management information 15 is the "exclusive mode" (Step S501). If the "lock mode" of the lock management information 15 is the "exclusive mode" (Yes at Step S501), the conflict determiner 22a determines whether there is any task that waits for all existing tasks to release their locks (Step S502).

If there is any task that waits for all existing tasks to release their locks (Yes at Step S502), the conflict determiner 22a determines whether a predetermined period of time has elapsed since the "lock mode" of the lock management information 15 changed to the "exclusive mode" (Step S503). If determining that the predetermined period of time has elapsed since the "lock mode" of the lock management information 15 changed to the "exclusive mode" (Yes at Step S503), the conflict determiner 22a performs the following step. Specifically, the conflict determiner 22a determines whether a predetermined period of time has elapsed since the last task acquired a lock in the "shared mode" (Step S504).

If thereafter determining that the predetermined period of time has elapsed since the last task acquired the lock in the "shared mode" (Yes at Step S504), the conflict determiner 22a determines that there is a conflict (Step S505). Then, the conflict determiner 22a notifies the lock request processor 21a of the occurrence of the conflict and terminates the process.

If no task waits for the release of the locks (No at Step S502), the conflict determiner 22a determines that there is no conflict (Step S507) and notifies the lock request processor 21a of the occurrence of no conflict before terminating the process. If the predetermined period of time is yet to elapse after the "lock mode" of the lock management information 15 has changed to the "exclusive mode" (No at Step S503), the conflict determiner 22a performs the following step. Specifically, the conflict determiner 22a configures the host device so as to start a regular conflict determining process to be described later after the lapse of a predetermined period of time (Step S506). Thereafter, the conflict determiner 22a determines that there is no conflict (Step S507) and terminates the process. If determining that the predetermined period of time is yet to elapse since the last task successfully acquired the lock in the "shared mode" (No at Step S504), the conflict determiner 22a configures the host device so as to start the regular conflict determining process after the lapse of a predetermined period of time (Step S506).

Figure 12:
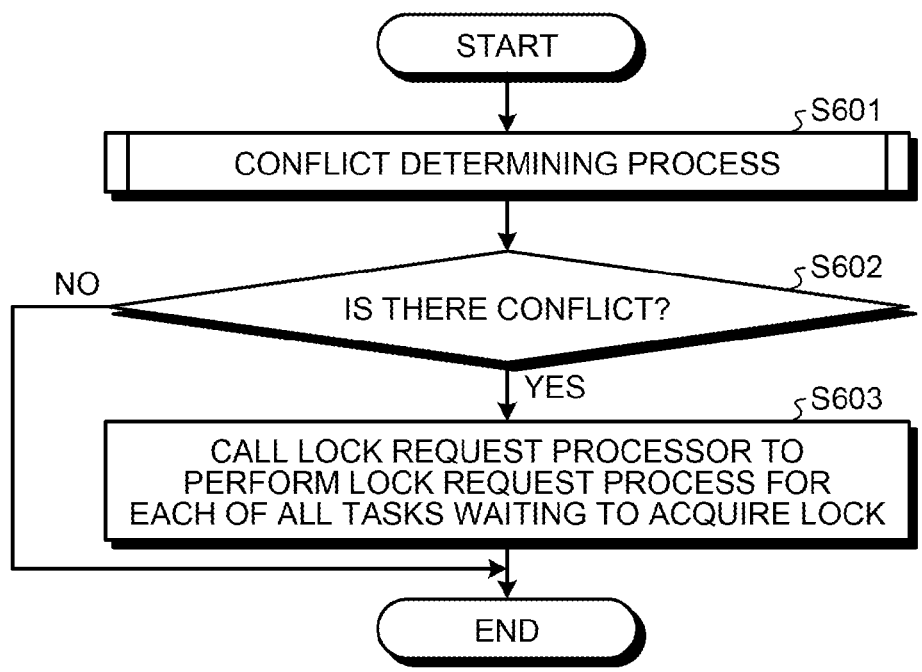
FIG. 12 is a flowchart for illustrating a regular conflict determining process.

FIG. 12 is a flowchart for illustrating the regular conflict determining process. The conflict determiner 22a, if set at Step S506 illustrated in FIG. 11 to start the regular conflict determining process, starts a process illustrated in FIG. 12 after the lapse of a predetermined period of time. Specifically, the conflict determiner 22a performs the conflict determining process illustrated in FIG. 11 (Steps S501 to S507 of FIG. 11) (Step S601). Next, the conflict determiner 22a determines whether there is a conflict (Step S602).

If determining that there is a conflict (Yes at Step S602), the conflict determiner 22a calls the lock request processor 21a to perform the lock request process illustrated in FIG. 10 again for each of all tasks waiting for acquisition of a lock (Step S603). The conflict determiner 22a thereafter terminates the process. Alternatively, the conflict determiner 22a, if determining that there is no conflict (No at Step S602), terminates the process. Specifically, the conflict determiner 22a performs the processes illustrated in FIG. 11 and FIG. 12 at regular intervals to thereby determine whether there is a conflict.

Effects of Second Embodiment

As described heretofore, the lock control apparatus 20a according to the second embodiment determines that there is a conflict, if a task that has acquired a lock in the "shared mode" waits for another task that has acquired a lock in the "exclusive mode" to release the lock for a predetermined period of time. Specifically, the conflict determiner 22a of the lock control apparatus 20a determines that there is a conflict, if a task that has acquired a lock in the "exclusive mode" and another task that has acquired a lock in the "shared mode" wait for the predetermined period of time to elapse.

This permits the lock control apparatus 20a to determine easily whether there is a conflict. Specifically, the lock control apparatus 20a can determine the occurrence of a conflict without having to store in memory information on a task that has so far requested acquisition of a lock as the lock management information 15. Thus, the lock control apparatus 20a permits easy implementation, while keeping small a circuit scale of the resource management apparatus 1.

[c] Third Embodiment

While the present invention has been particularly described with reference to preferred embodiments, it will be understood that the embodiments are not intended to limit the present invention and various changes in form and detail may be made therein. Other embodiments encompassed by the present invention will therefore be described below as a third embodiment.

(1) Conflict Determination

The conflict determiner 22 described above determines that there is a conflict, if a task acquires a lock in the "exclusive mode" when another task has acquired a lock in the "shared mode", and the another task that has acquired the lock in the "shared mode" requests acquisition of a lock in duplicate in the "shared mode". The conflict determiner 22a described above determines that there is a conflict, if a task has acquired a lock in the "exclusive mode" and another task has acquired a lock in the "shared mode", and both of these tasks wait for a predetermined period of time thereafter.

These are, however, not the only possible methods for determining the occurrence of a conflict and various other methods may be employed to determine the occurrence of a conflict. Other example processes for determining whether there is a conflict will be described below with reference to FIGS. 13 and 14.

Figure 13:
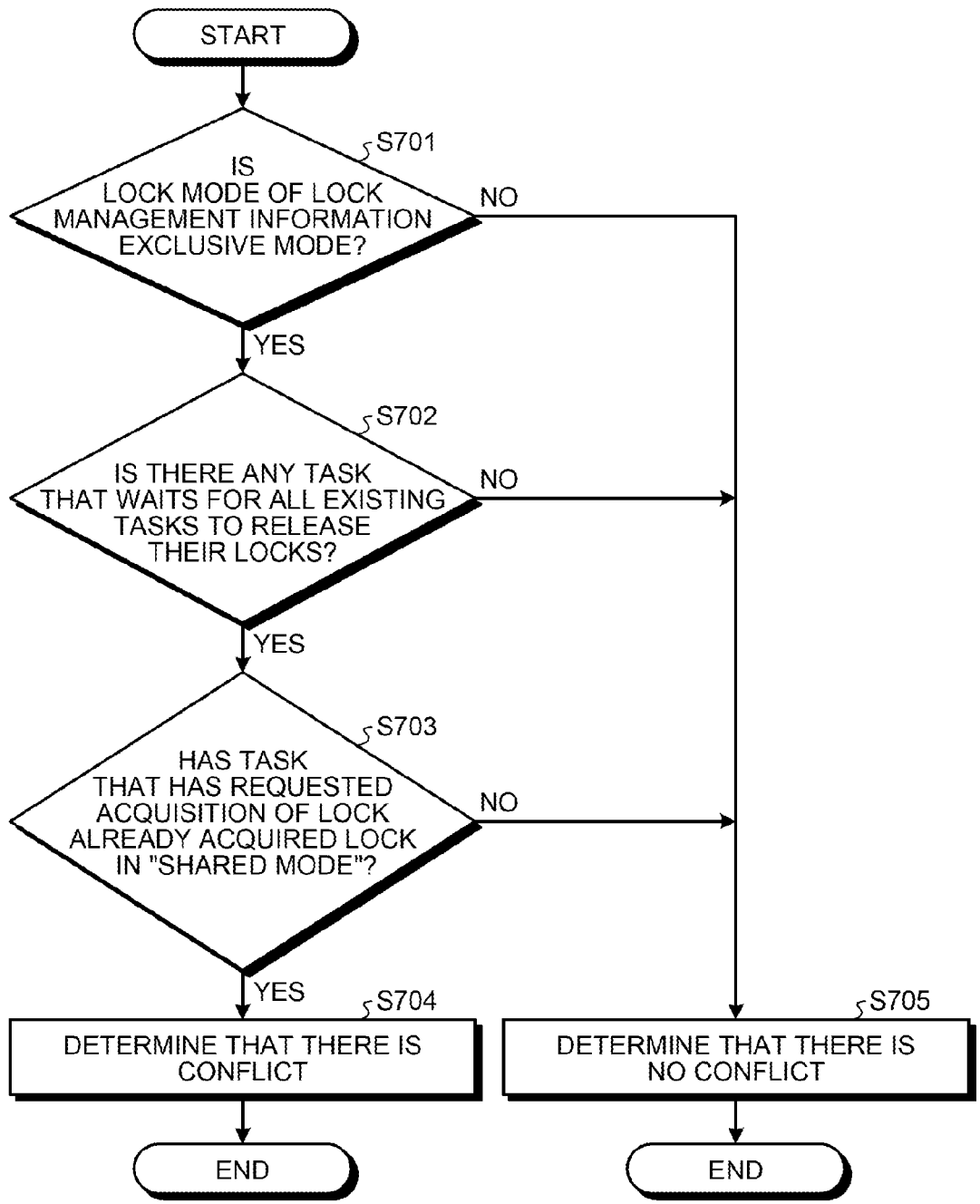
FIG. 13 is an example flowchart (1) for illustrating a process for determining whether a conflict has occurred.

FIG. 13 is an example flowchart (1) for illustrating steps for determining whether a conflict has occurred. It is noted that the process illustrated in FIG. 13 represents a generalized approach of the process illustrated in FIG. 7. In the description that follows, a lock control apparatus 20b according to the third embodiment includes a lock request processor 21b, a conflict determiner 22b, and the lock release processor 23.

For example, the conflict determiner 22b according to the third embodiment determines whether the "lock mode" of the lock management information 15 is the "exclusive mode" (Step S701). If the "lock mode" of the lock management information 15 is the "exclusive mode" (Yes at Step S701), the conflict determiner 22b determines whether there is any task that waits for all existing tasks to release their locks (Step S702). If there is any task that waits for all existing tasks to release their locks (Yes at Step S702), the conflict determiner 22b determines whether the task that has requested the acquisition of the lock has already acquired the lock in the "shared mode" (Step S703).

If the task that has requested the acquisition of the lock has already acquired the lock in the "shared mode" (Yes at Step S703), the conflict determiner 22b determines that there is a conflict (Step S704). If the "lock mode" of the lock management information 15 is not the "exclusive mode" (No at Step S701), the conflict determiner 22b determines that there is no conflict (Step S705). Similarly, if there is no task that waits for all existing tasks to release their locks (No at Step S702), the conflict determiner 22b determines that there is no conflict (Step S705). If the task that has requested the acquisition of the lock has not acquired the lock in the "shared mode" (No at Step S703), the conflict determiner 22b determines that there is no conflict (Step S705).

The lock control apparatus 20b including a conflict determiner such as the conflict determiner 22b described above can determine the occurrence of a conflict. As a result, the lock control apparatus 20b can adequately prevent a deadlock.

In another example, the conflict determiner 22b determines as follows, if a task acquires a lock in the "exclusive mode" when the lock mode is the "shared mode" and another task requests acquisition of a lock in the "shared mode". Specifically, the conflict determiner 22b determines whether the task that has requested acquisition of a lock in the "shared mode" has acquired another lock in the "shared mode". If determining that the task that has requested acquisition of a lock in the "shared mode" has acquired another lock in the "shared mode", the conflict determiner 22b may determine that there is a conflict.

Figure 14:
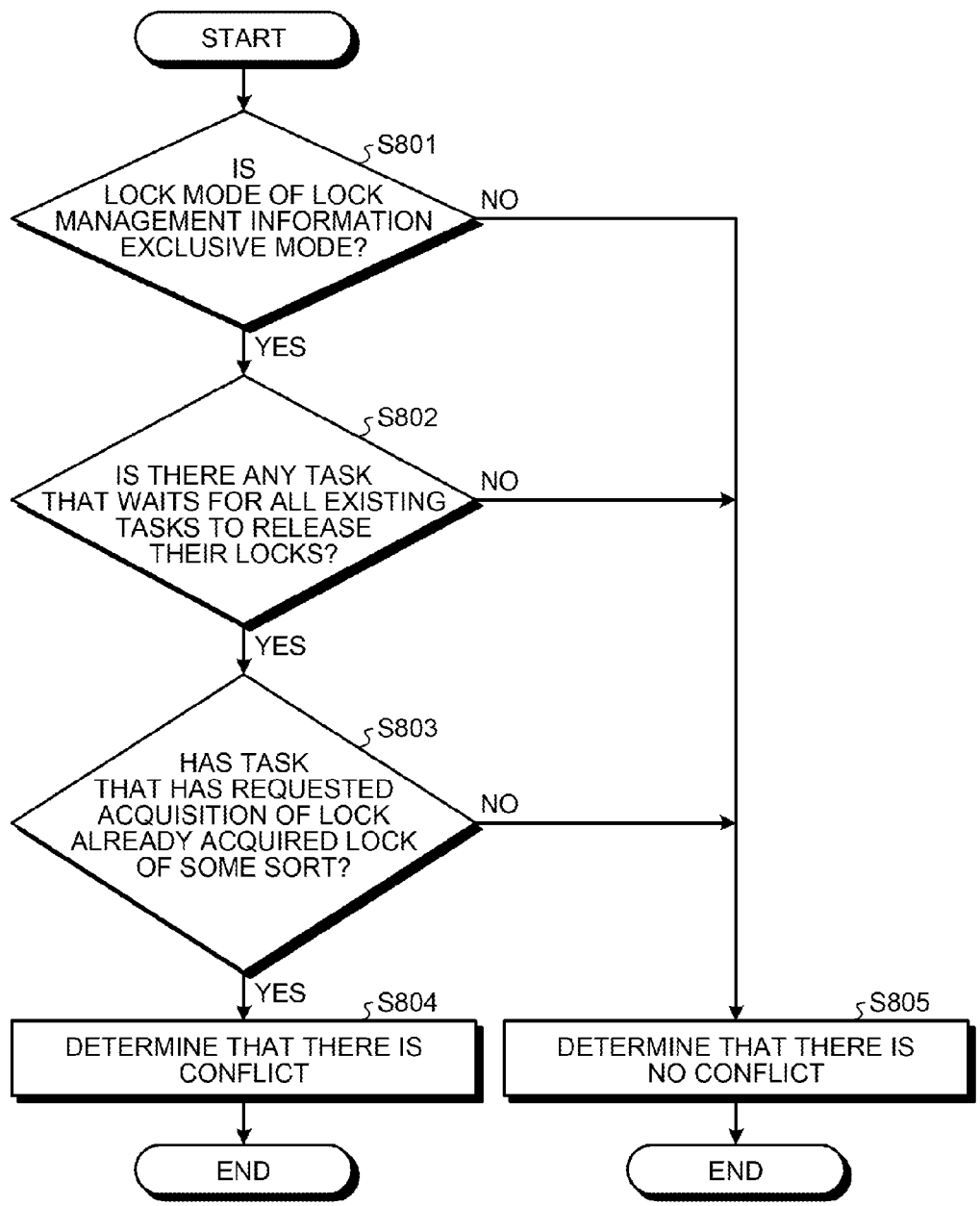
FIG. 14 is an example flowchart (2) for illustrating a process for determining whether a conflict has occurred.

FIG. 14 is an example flowchart (2) for illustrating steps for determining whether a conflict has occurred. It is noted that, of steps illustrated in FIG. 14, Steps S801, S802, S804, and S805 are the same as Steps S701, S702, S704, and S705 in FIG. 13 and descriptions therefor will be omitted.

If there is any task that waits for all existing tasks to release their locks (Yes at Step S802), the conflict determiner 22b determines whether a task that has requested acquisition of a lock has already acquired a lock of some sort (Step S803). If the task that has requested acquisition of a lock has already acquired a lock of some sort (Yes at Step S803), the conflict determiner 22b determines that there is a conflict (Step S804).

As such, the conflict determiner 22b determines whether there is a conflict by determining whether a task that has requested acquisition of a lock has already acquired another lock. As a result, the lock control apparatus 20b has only to store in the lock management information 15 whether each queue has acquired a lock, without having to place all tasks that have acquired locks in the "lock acquired queue". Thus, the lock control apparatus 20b permits easy implementation, while keeping small a circuit scale of the resource management apparatus 1.

(2) Matrices

The asymmetric matrix 11 depicted in FIG. 2 stores therein "Y", "Y (wait)", and "N" as information that indicates the permission of acquisition of a lock. The temporary matrix 13 depicted in FIG. 3 stores therein "Y (retained in the exclusive mode)" and "N" as information that indicates the permission of acquisition of a lock. The information that indicates the permission of acquisition of a lock cited above is only exemplary and any information may be stored as long as the information achieves the above-described functions.

(3) Computer Programs

Figures 15, 16:
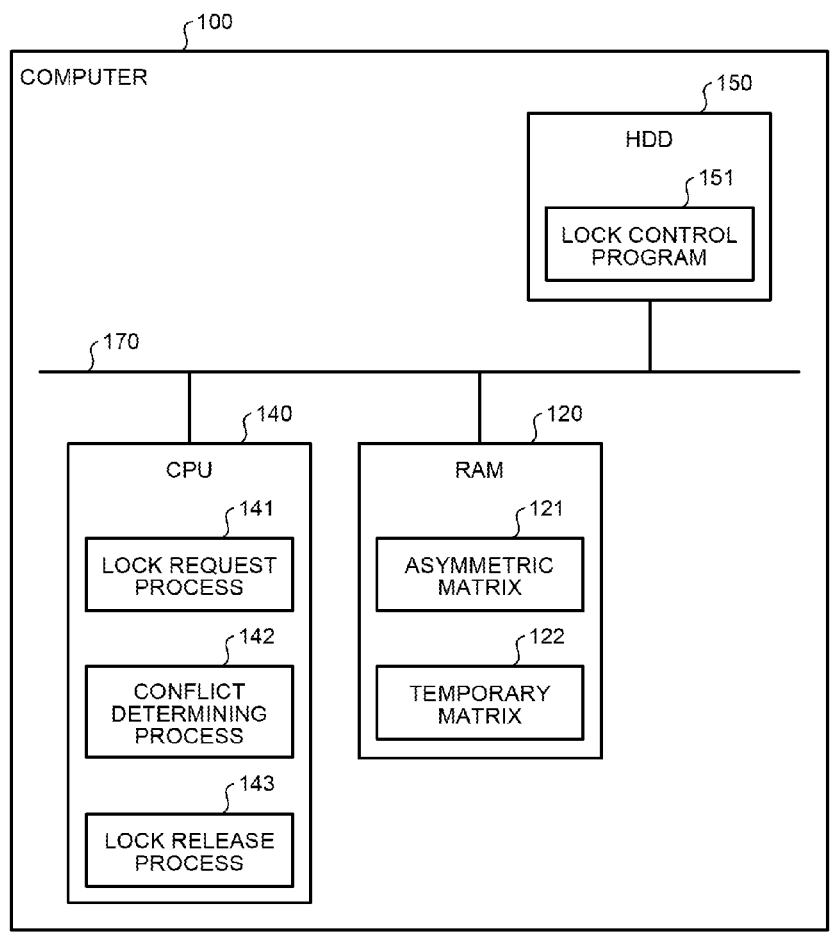
FIG. 15 is a diagram for illustrating an example computer that performs a lock control program.
FIG. 16 is a diagram for illustrating a matrix that indicates the permission to acquire a lock of a shared resource.
Figure 17:
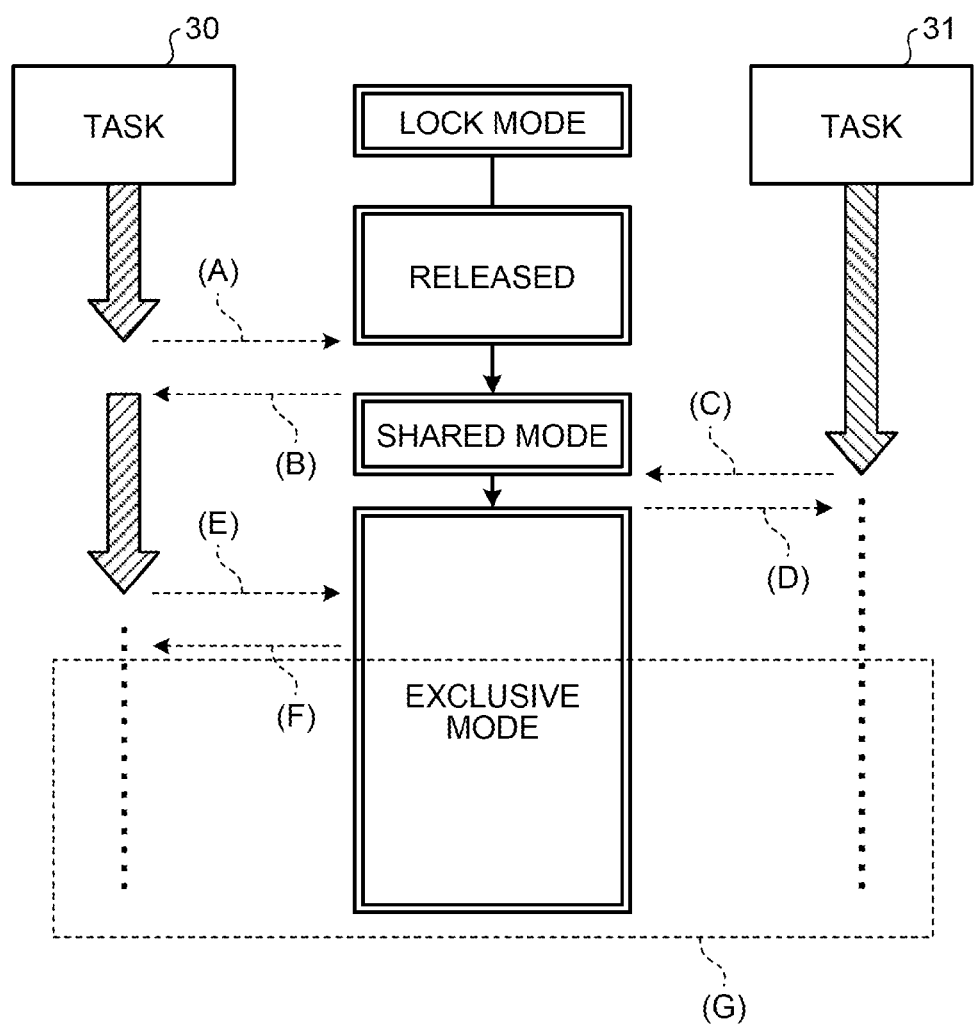
FIG. 17 is a diagram for illustrating occurrence of a deadlock.

The first to third embodiments have been described for cases in which hardware is incorporated to perform various types of processing. These are, however, not the only possible embodiments; alternatively, the processing may be performed by causing a computer to execute a previously prepared computer program. The following describes an example computer that executes a computer program having similar functions as those of the lock control apparatus 20 described in the first embodiment with reference to FIG. 15. FIG. 15 is a diagram for illustrating the example computer that performs a lock control program.

This computer 100 depicted as an example in FIG. 15 includes a random access memory (RAM) 120 and a hard disk drive (HDD) 150 both connected to a bus 170. The computer 100 depicted as an example in FIG. 15 further includes a central processing unit (CPU) 140 connected to the bus 170.

The HDD 150 stores therein a lock control program 151 in advance. The CPU 140 reads the lock control program 151 from the HDD 150 and executes the lock control program 151. This loads an asymmetric matrix 121 and a temporary matrix 122 on the RAM 120. It is noted that the asymmetric matrix 121 is the same as the asymmetric matrix 11 illustrated in FIG. 1 and the temporary matrix 122 is the same as the temporary matrix 13 illustrated in FIG. 1.

Functions of a lock request process 141, a conflict determining process 142, and a lock release process 143 are enabled in the CPU 140 when the CPU 140 reads and executes the lock control program 151. The lock request process 141, the conflict determining process 142, and the lock release process 143 each exhibit the same function as those of the lock request processor 21, the conflict determiner 22, and the lock release processor 23 illustrated in FIG. 1. Additionally, the lock request process 141, the conflict determining process 142, and the lock release process 143 are each made to exhibit a function equivalent to that of a corresponding element described with reference to the second embodiment and the third embodiment.

The lock control program described with reference to the embodiments of the present invention can be achieved by a personal computer, a workstation, or any other type of computer executing a previously prepared computer program. This program may be distributed over a network, such as the Internet. The program is recorded on a computer-readable recording medium, such as a hard disk, a flexible disk (FD), a compact disc read only memory (CD-ROM), a magneto-optical disc (MO), and a digital versatile disk (DVD). The program may even be executed by being read from a recording medium by a computer.

According to one aspect of the above embodiments, a deadlock can be avoided.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A lock control apparatus comprising:
a control unit that controls acquisition of a lock for using a shared resource shared among a plurality of tasks by a task according to first lock information that indicates whether to permit the tasks to acquire the lock for each combination of a mode of a lock currently acquired by the task and a mode of a lock newly requested for acquisition; and
a determining unit that determines whether there occurs a deadlock that prohibits for acquisition of the lock by the tasks when the control unit controls the acquisition of the lock according to the first lock information, wherein
when the determining unit determines that there occurs the deadlock for acquisition of the lock, the control unit controls acquisition of the lock by the tasks so as to avoid the deadlock according to second lock information that indicates whether to permit acquisition of the lock for each combination of a mode of a lock currently acquired by the task and a mode of a lock newly requested for acquisition,
the acquisition of the lock by a task that has requested for the acquisition of the lock is not permitted according to the first lock information when a mode of a lock currently acquired by the task is an exclusive mode in which only a task that has acquired a lock is permitted to use the shared resource and if a mode of a lock requested by the another task is a shared mode in which any task other than a task that has acquired a lock is also permitted to refer to the shared resource, and
the acquisition of the lock by a task that has requested for the acquisition of the lock is permitted according to the second lock information when the mode of a lock currently acquired by the task is the exclusive mode and the mode of a lock requested for acquisition by the another task is the shared mode.

2. The lock control apparatus according to claim 1, wherein when a mode of a lock currently acquired by a first task is the shared mode and a second task requests acquisition of a lock in the exclusive mode, the control unit permits the acquisition of the lock in the exclusive mode by the second task, and complies with the first lock information to cause the second task to wait in a queue for using the shared resource until the first task that has acquired the lock in the shared mode releases the lock.

3. The lock control apparatus according to claim 1, wherein when a mode of a lock currently acquired by a first task is an exclusive mode in which only a task that has acquired a lock is permitted to use the shared resource and a second task requests acquisition of a lock in a shared mode in which any task other than a task that has acquired a lock is also permitted to refer to the shared resource, the control unit complies with the second lock information to permit the second task to refer to the shared resource, while retaining the mode of the currently acquired lock in the exclusive mode.

4. The lock control apparatus according to claim 1, wherein the determining unit determines that there occurs the deadlock when a first task that has acquired the lock in a shared mode waits for a second task that has acquired the lock in an exclusive mode to release the lock for a predetermined period of time, the shared mode permitting any task other than a task that has acquired a lock to refer to the shared resource, the exclusive mode permitting only a task that has acquired a lock to use the shared resource.

5. The lock control apparatus according to claim 1, wherein the determining unit determines that there occurs the deadlock when there is a second task that has acquired a lock in an exclusive mode while a first task acquiring the lock in a shared mode and the first task requests acquisition of a lock in the shared mode in duplicate, the shared mode permitting any task other than a task that has acquired a lock to refer to the shared resource, the exclusive mode permitting only a task that has acquired a lock to use the shared resource.

6. The lock control apparatus according to claim 1, wherein when a new task requests acquisition of a lock in a shared mode when there is a second task that has acquired a lock in an exclusive mode while a first task acquiring the lock in a shared mode, the determining unit determines whether the new task has acquired another lock in the shared mode and, upon determining that the new task has acquired the other lock, the determining unit determines that there occurs the deadlock, the shared mode permitting any task other than a task that has acquired a lock to refer to the shared resource, the exclusive mode permitting only a task that has acquired a lock to use the shared resource.

7. The lock control apparatus according to claim 1, wherein the acquisition of the lock by a task that has requested for the acquisition of the lock is not permitted according to the first lock information when a mode of a lock currently acquired by the task is the exclusive mode and if a mode of a lock requested by the another task is the exclusive mode, and
the acquisition of the lock by a task that has requested for the acquisition of the lock is not permitted according to second lock information when the mode of a lock currently acquired by the task is the exclusive mode and the mode of a lock requested for acquisition by the another task is the exclusive mode.

8. A computer-readable recording medium having stored therein a lock control program causing an information processing apparatus that performs tasks to execute a process comprising:
controlling acquisition of a lock for using a shared resource shared among a plurality of tasks by a task according to first lock information that indicates whether to permit the tasks to acquire the lock for each combination of a mode of a lock currently acquired by the task and a mode of a lock newly requested for acquisition;
determining whether there occurs a deadlock that prohibits for acquisition of the lock by the tasks when the control unit controls the acquisition of the lock according to the first lock information; and
upon determining that there occurs the deadlock for acquisition of the lock by the tasks so as to avoid the deadlock, controlling acquisition of the lock by the tasks according to second lock information that indicates whether to permit acquisition of the lock for each combination of a mode of a lock currently acquired by the task and a mode of a lock newly requested for acquisition,
the acquisition of the lock by a task that has requested for the acquisition of the lock is not permitted according to the first lock information when a mode of a lock currently acquired by the task is an exclusive mode in which only a task that has acquired a lock is permitted to use the shared resource and if a mode of a lock requested by the another task is a shared mode in which any task other than a task that has acquired a lock is also permitted to refer to the shared resource, and the acquisition of the lock by a task that has requested for the acquisition of the lock is permitted according to the second lock information when the mode of a lock currently acquired by the task is the exclusive mode and the mode of a lock requested for acquisition by the another task is the shared mode.

9. A lock control method performed by an information processing apparatus that performs tasks, the lock control method comprising:

controlling acquisition of a lock for using a shared resource shared among a plurality of tasks by a task according to first lock information that indicates whether to permit the tasks to acquire the lock for each combination of a mode of a lock currently acquired by the task and a mode of a lock newly requested for acquisition;

determining whether there occurs a deadlock that prohibits for acquisition of the lock by the tasks when the control unit controls the acquisition of the lock according to the first lock information; and upon determining that there occurs the deadlock for acquisition of the lock by the tasks so as to avoid the deadlock, controlling acquisition of the lock by the tasks according to second lock information that indicates whether to permit acquisition of the lock for each combination of a mode of a lock currently acquired by the task and a mode of a lock newly requested for acquisition, the acquisition of the lock by a task that has requested for the acquisition of the lock is not permitted according to the first lock information when a mode of a lock currently acquired by the task is an exclusive mode in which only a task that has acquired a lock is permitted to use the shared resource and if a mode of a lock requested by the another task is a shared mode in which any task other than a task that has acquired a lock is also permitted to refer to the shared resource, and the acquisition of the lock by a task that has requested for the acquisition of the lock is permitted according to the second lock information when the mode of a lock currently acquired by the task is the exclusive mode and the mode of a lock requested for acquisition by the another task is the shared mode.

\* \* \* \* \*